United States Patent [19]
Fujii et al.

[11] Patent Number: 5,551,060
[45] Date of Patent: Aug. 27, 1996

[54] STRUCTURE OF CELLS WITHIN A MOBILE COMMUNICATION SYSTEM

[75] Inventors: Teruya Fujii; Masayuki Sakamoto, both of Kanagawa, Japan

[73] Assignee: Nippon Telegraph and Telephone Corporation, Tokyo, Japan

[21] Appl. No.: 936,450

[22] Filed: Aug. 28, 1992

[30] Foreign Application Priority Data

Sep. 3, 1991 [JP] Japan ................................. 3-248413

[51] Int. Cl.$^6$ ...................................... H04B 7/00
[52] U.S. Cl. ..................... 455/33.4; 455/33.1; 455/33.3; 455/54.1; 455/62; 379/59; 343/890
[58] Field of Search ................................ 455/33.1, 33.2, 455/33.3, 33.4, 54.1, 54.2, 56.1, 62, 101, 129; 343/890, 891; 379/58, 59, 60

[56] References Cited

U.S. PATENT DOCUMENTS

| | | | |
|---|---|---|---|
| 4,128,740 | 12/1978 | Graziano | 455/33.3 |
| 4,144,411 | 3/1979 | Frenkiel | 455/33.3 |
| 4,144,496 | 3/1979 | Cunningham et al. | 455/33.3 |
| 4,242,538 | 12/1980 | Ito et al. | |
| 4,249,181 | 2/1981 | Lee | 455/33.3 |
| 4,947,452 | 8/1990 | Hattori et al. | 455/33.3 |
| 5,119,501 | 6/1992 | Perry et al. | 455/33.3 |
| 5,230,081 | 7/1993 | Yamada et al. | 455/54.1 |
| 5,276,907 | 1/1994 | Meidan | 455/33.3 |

FOREIGN PATENT DOCUMENTS 0297062  12/1988  Japan .

OTHER PUBLICATIONS

Patent Abstracts of Japan, vol. 005, No. 137 JP-A-56 072 547.
E. W. Beddoes, Electronics and Communication Engineering Journal, "Uk Cellular Radio Developments", vol. 3, No. 4, Aug. 1991, pp. 149-158.
P. T. Porter, IEEE Transaction on Vehicular Technology, "Superviosion and Control Features of a Small-Zone Radiotelephone System", vol. 20, No. 3, Aug. 1979, pp. 75-79.

Patent Abstracts of Japan, vol. 016, No. 236, JP-A-40 47 722.

Patent Abstracts of Japan, vol. 016, No. 031, JP-A-32 44 224.

"Reuse Partitioning in Cellular Systems", Halpern, 33rd IEEE Vehicular Technology Conference, May 25-27, 1983, pp. 322-327.

Primary Examiner—Andrew Faile
Assistant Examiner—Doris To
Attorney, Agent, or Firm—Nikaido, Marmelstein, Murray & Oram LLP

[57] ABSTRACT

A re-use partition of cells in a mobile communication system has an outer cell (30) and an inner cell (20) which is provided in the outer cell (30). An interval of cells using the same channel or the same frequency in the inner cells is shorter than an interval in the outer cells, which is the nature of a re-use partition. Communication between a base station and a mobile station is carried out by using a channel having a higher received level of an outer cell channel or an inner cell channel. A base station has a first beam tilt antenna having tilt angle ($\Theta_{out}$) for an outer cell (30), and a second beam tilt antenna having tilt angle ($\Theta_{in}$) so that $\Theta_{in}$ is larger than $\Theta_{out}$. A speech channel and a control channel are provided for each of the first antenna and the second antenna.

17 Claims, 25 Drawing Sheets

(a)

OMNI-CELL (b)

SECTORED-CELL (a)

(b) REPETITION OF LARGER CELLS

VIRTUAL SMALL CELL (c) REPETITION OF SMALLER CELLS

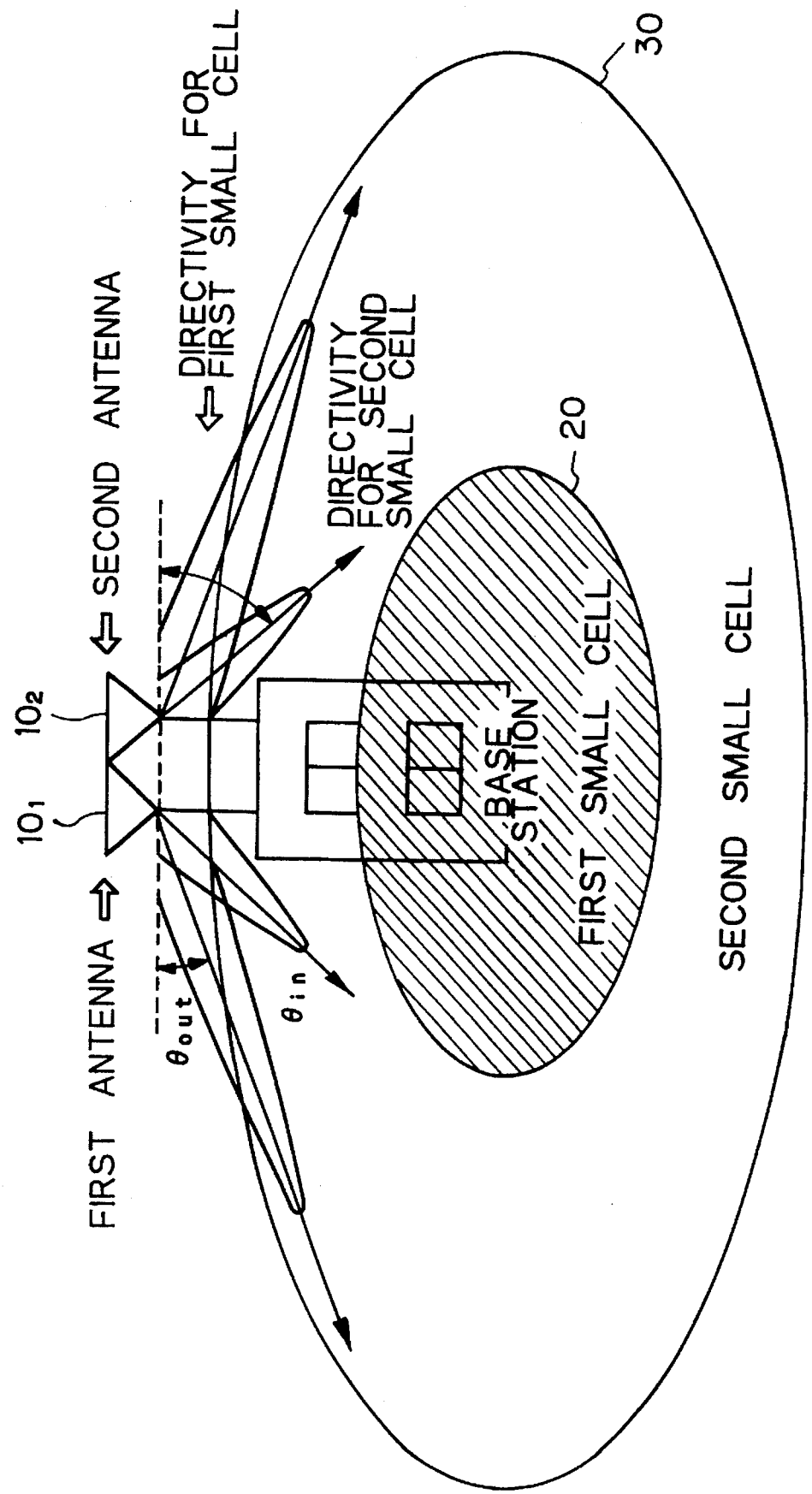

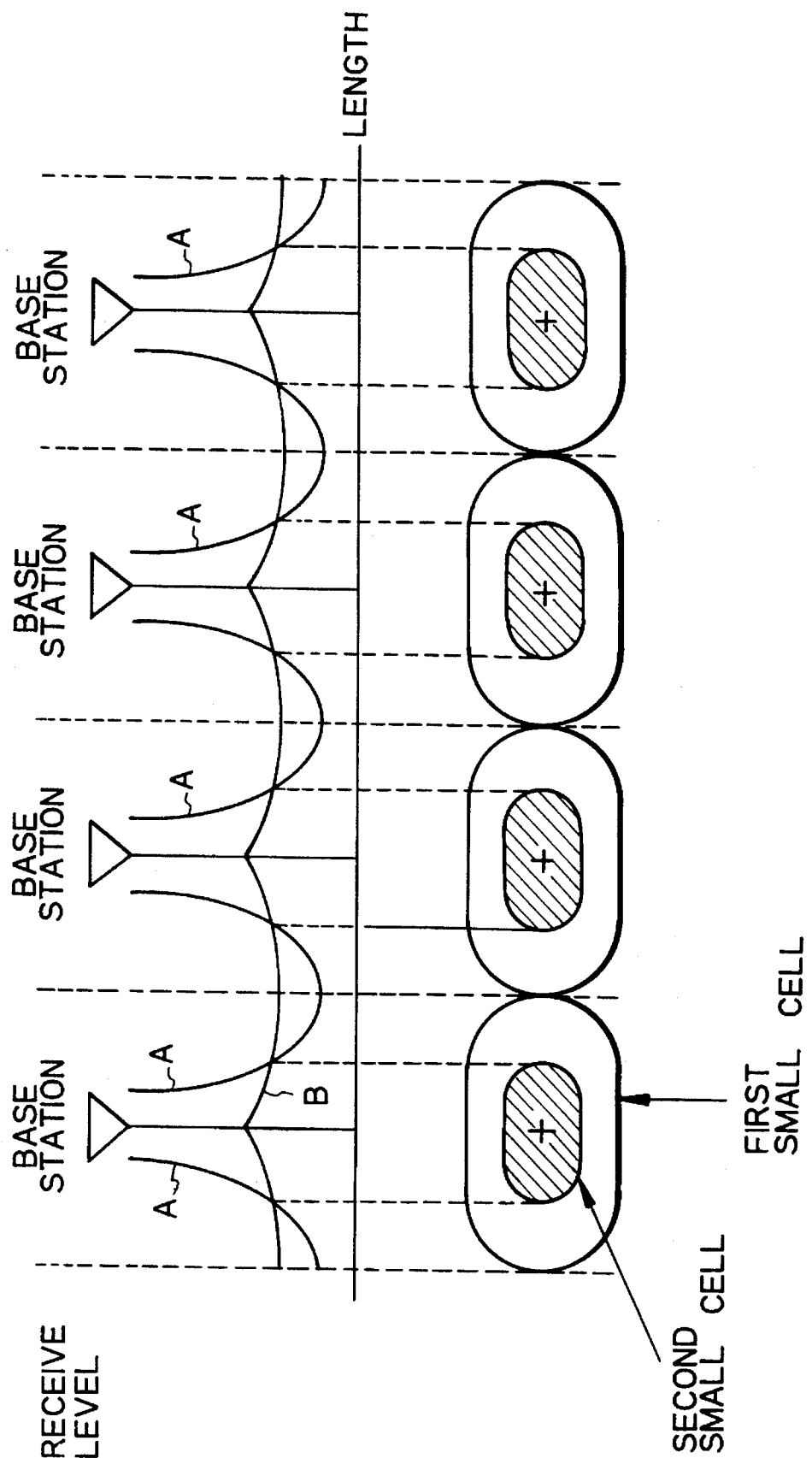

(a)

(b)

⇐ FIRST SMALL CELL

⇐ FIRST SMALL CELL

⇐ FIRST SMALL CELL

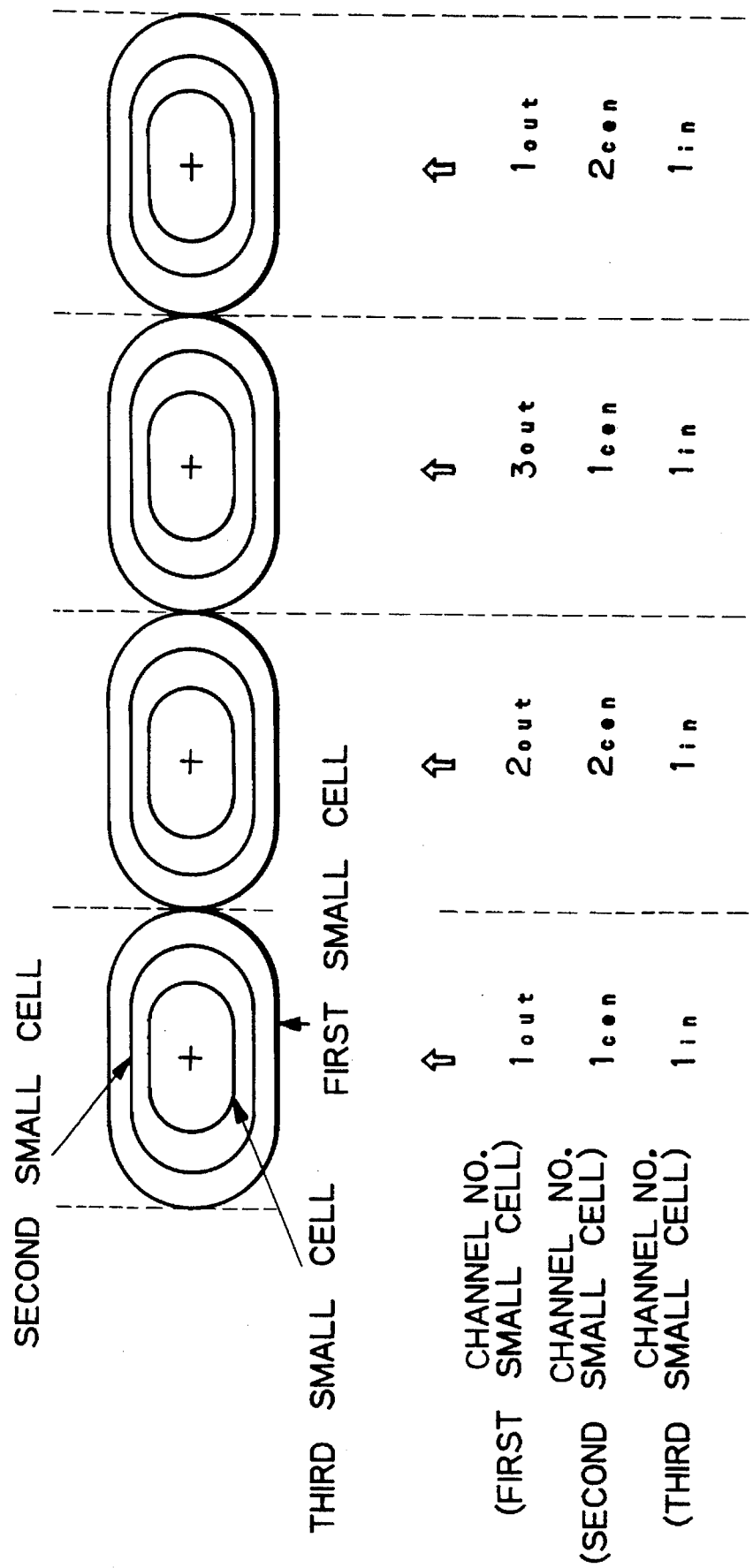

STRUCTURE OF CELLS WITHIN A MOBILE COMMUNICATION SYSTEM

BACKGROUND OF THE INVENTION

The present invention relates to a mobile communication system, in particular, relates to structure of cells in such a communication system.

FIG. 1 shows cells in a mobile communication system, in which the same channels are re-used with some spacing. The thick line in FIG. 1 shows a unit of a cluster. Each hexagon shows a cell, and a numeral in a cell shows a channel. The same numerals show the same channels which use the same frequency. The same channel or the same frequency is re-used in a cell in another cluster. The structure of a cell may be either an omni-cell as shown in FIG. 2(a) in which a base station having a non-directional antenna is located around a center of a cell, or a sector cell as shown in FIG. 2(b) in which a directional antenna divides an area into a plurality of sectored cells each of which is assigned a specific channel or frequency.

A re-use partition considers a virtual small cell, which uses the same frequency with the shorter spacing than that of cells. The re-use technique increases the spectrum efficiency in a mobile communication system.

An idea of a re-use partition is described in accordance with FIG. 3. FIG. 3(a) shows an example of the use of the same frequency. A circled line shows a cell, a symbol (+) shows a base station around a center of a cell, a FIG. (1,2,3) shows a channel number, and d shows the spacing of the use of the same frequency. The same FIG. (1,2 or 3) shows the same channel or the same frequency. In the example of FIG. 3(a), the spacing of the same channels is three cells (d=3).

FIG. 3(b) and FIG. 3(c) show a typical re-use partition. FIG. 3(b) shows the spacing of outer cells, and FIG. 3(c) shows the spacing of inner cells, when virtual cells are introduced to the cell layout in FIG. 3(a). As shown in FIG. 3(b), the spacing of outer cells is three cells (d=3) which is the same as that of FIG. 3(a), on the other hand, the spacing of inner cells is two cells (d=2) in the example of FIG. 3(c). Since the spacing or the spectrum efficiency of inner cells is improved by a re-use partition, the total efficiency of the use of frequencies is improved. The spacing or the efficiency of inner cells improved by improving a cell selection accuracy to determine which cell (outer cell or inner cell) a mobile station is located in.

In a prior re-use partition system, a control channel for mobile communication for connection et al is common to both an outer cell and an inner cell. In other words, both an outer cell and an inner cell are handled as a single control cell. As shown in FIG. 4, a control channel for access is used commonly to outer cells and inner cells, and a speech channel has a specific transmiter for each outer cell and each inner cell.

In FIG. 4, an antenna is used commonly in outer channels, and inner channels. A plurality of tranceivers ($TRX_{out}$) for outer cells, and a plurality of tranceivers ($TRX_{in}$) for inner cells, and a single common controller channel tranceiver (TRX) are coupled with the antenna through an antenna multiplexer. Those tranceivers are coupled with the base station control, and the communication channels (external channels).

Accordingly, a prior re-use partition system in a mobile communication system has the disadvantages as follows:

First, a mobile station must be located to determine whether it is either in an inner cell or an outer cell in every access and during speech. If the decision is effected based upon a received level at a base station, operational load of a base station increases since the decision must be effected in a short time in connection time, and/or the decision must be always carried out during speech.

Further, if the decision is carried out merely based upon whether a received level exceeds a predetermined threshold level or not, the decision would not be accurate due to fading which is specific to mobile communication. In that case, it would be determined incorrectly as if a mobile station located in an inner cell merely because the received level is high, while the mobile station is located in an outer cell, and would increase undesirable interference.

SUMMARY OF THE INVENTION

It is an object, therefore, of the present invention to overcome the disadvantages and limitations of a prior mobile communication system by providing a novel and improved mobile communication system.

It is also an object of the present invention to provide a mobile communication system which reduces operation load of a base station, and improves effect of re-use partition of cells.

The above and other objects are attained by a mobile communication system having; a plurality of radio cells for a service area so that each cell is assigned a respective channel, and the same channel is used in two cells at least which are apart from each other by more than a predetermined distance comprising; a first small cell being provided in a radio cell by a first antenna provided in a base station, and a second small cell, which is smaller than the first small cell being provided in the first small cell by a second antenna provided in the base station, a cell interval, that the same channel is used in the second small cells, is smaller than a cell interval that the same channel is used in the first small cells, each small cell having a respective channel, a control channel covering a first small cell and a second small cell, communication between a mobile station and a base station being effected through a channel having a higher received level in a first channel and a second channel of at least one of a speech channel and a control channel.

BRIEF DESCRIPTION OF THE DRAWINGS

The foregoing and other objects, features, and attendant advantages of the present invention will be appreciated as the same become better understood by means of the following description and accompanying drawings wherein;

FIGS. 5A–5D show a first embodiment according to the present invention,

FIG. 16A–16C show still another embodiment according to the present invention.

DESCRIPTION OF THE PREFERRED EMBODIMENTS

Figure 1:
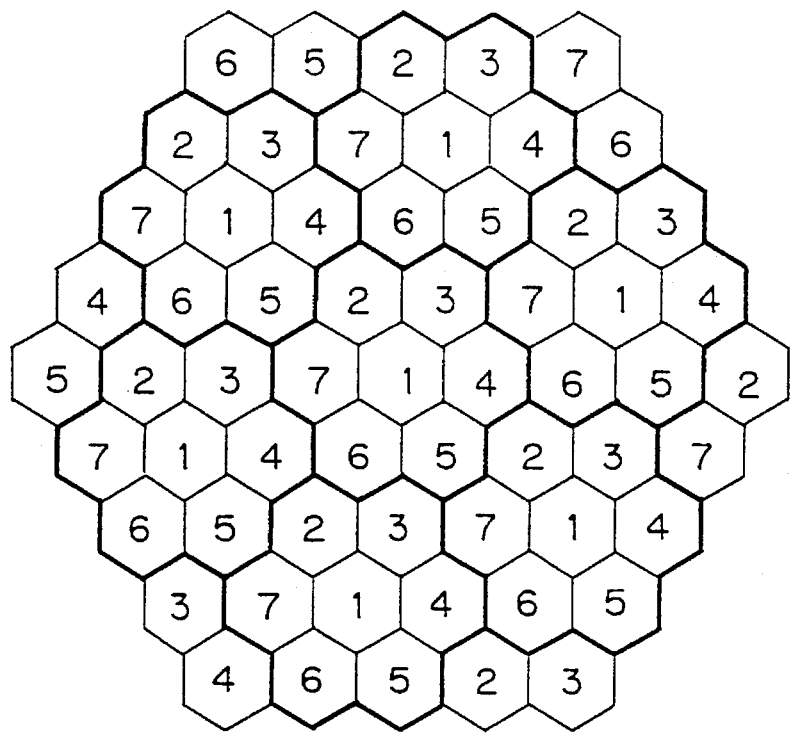
FIG. 1 shows structure of small cells.
Figure 2:
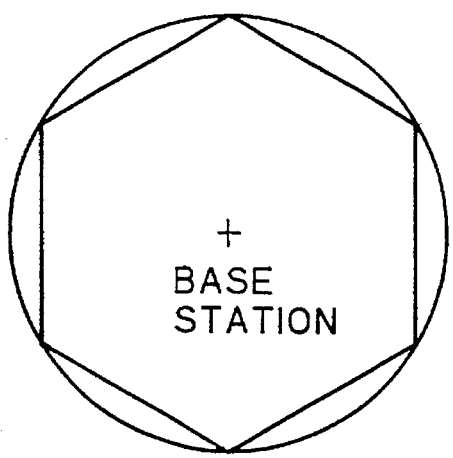
FIG. 2 shows an omni-cell and a sector cell.
Figure 2:
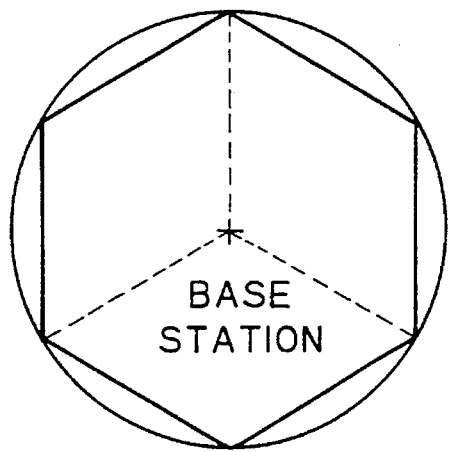
Figure 3:
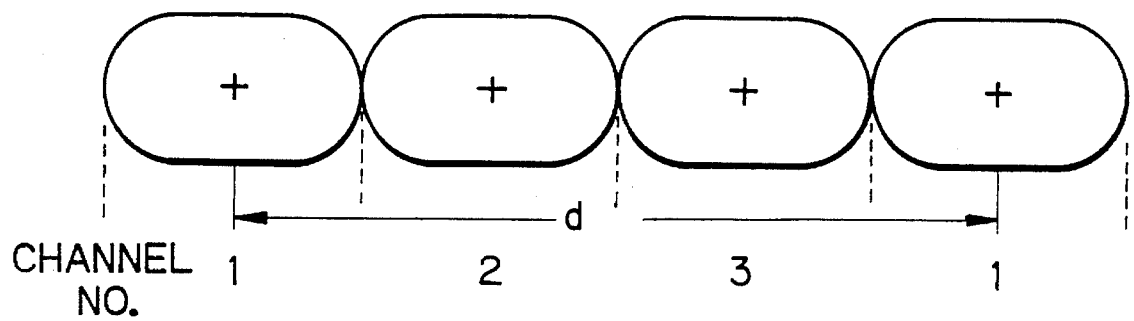
FIG. 3 shows an explanatory drawing of a re-use partition.
Figure 3:
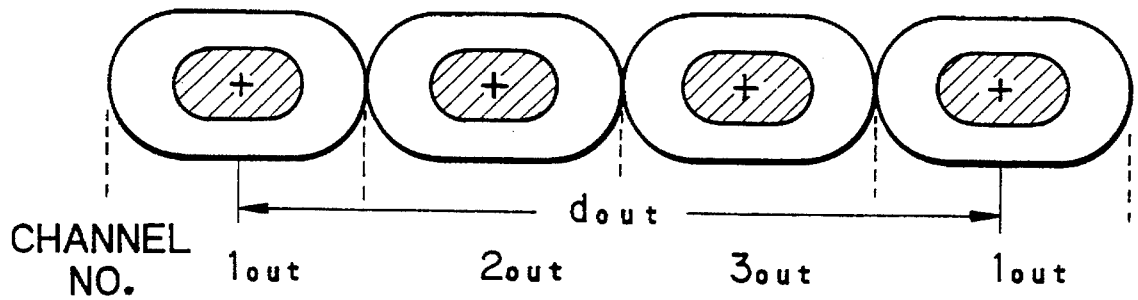
Figure 3:
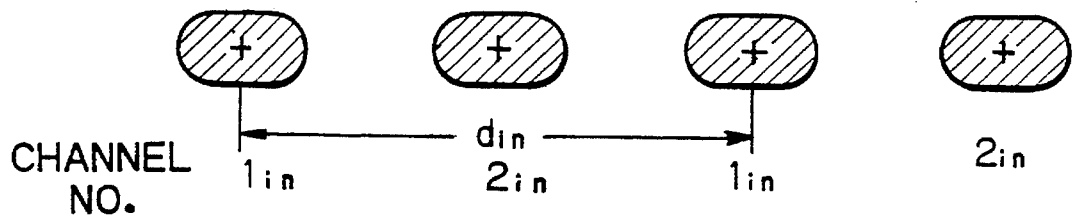
Figure 4:
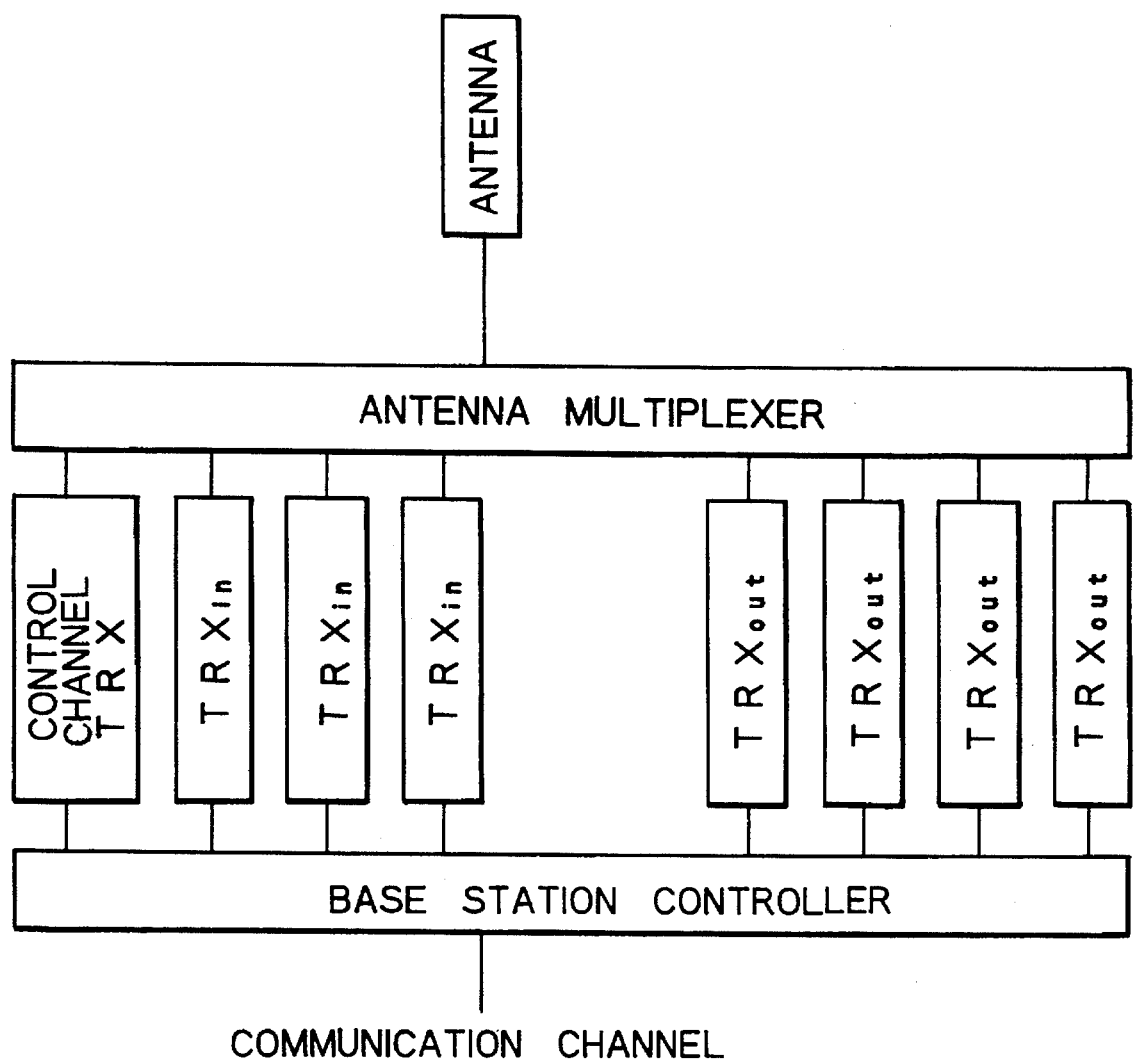
FIG. 4 is a block diagram of a base station in a prior art.
Figure 5A:
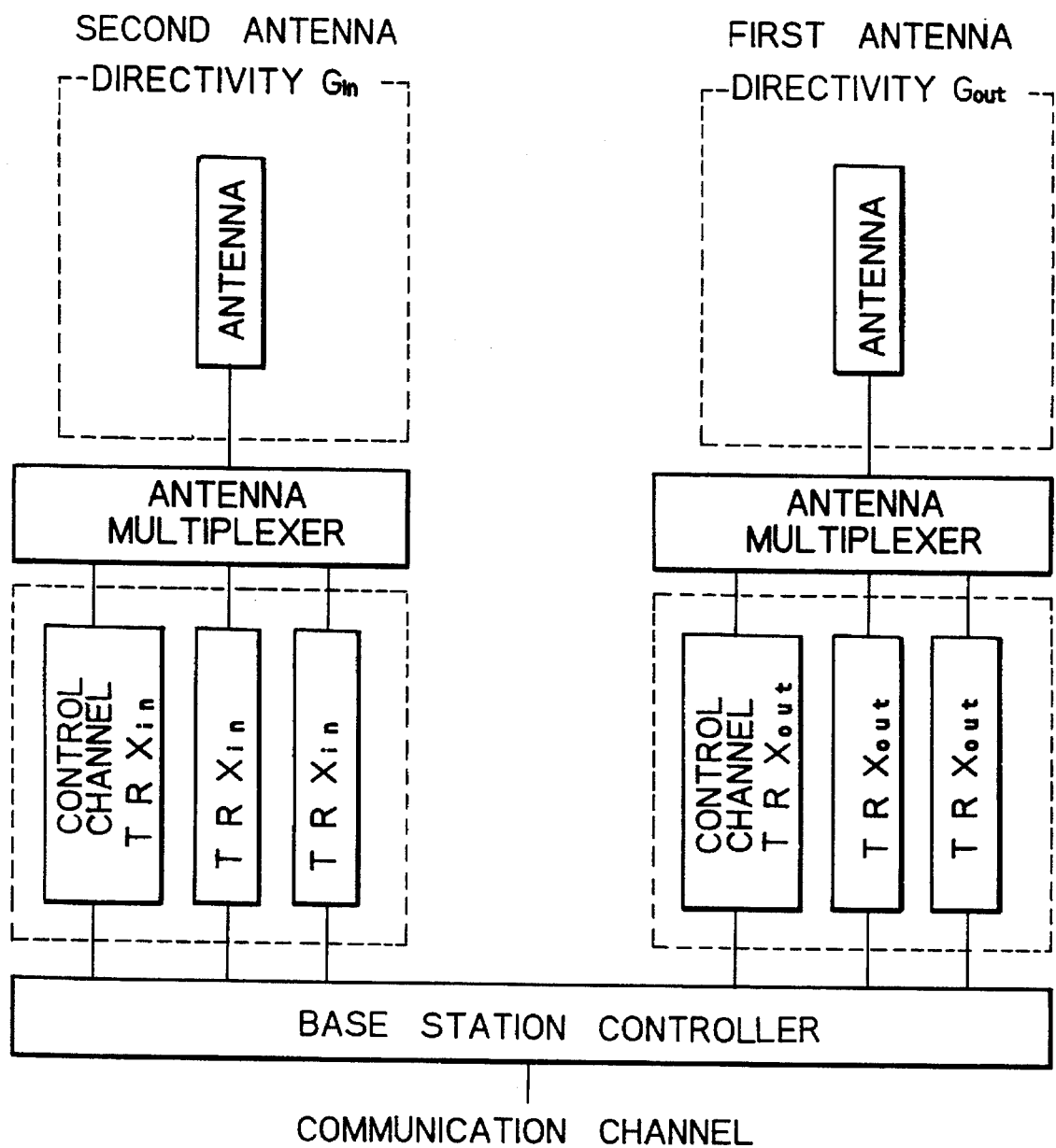

FIG. 5A shows a block diagram of a base station according to the present invention, in which it is assumed that a base station has two antennas having the directivities $\Theta_{in}$ and $\Theta_{out}$ in a vertical plane so that two different cells are obtained. Those cells are referred to as an inner cell and an outer cell. And, the respective base stations are called an inner base station, and an outer base station.

In FIG. 5A, an inner base station relating to the inner cell has a plurality of tranceivers ($TRX_{in}$) and a control channel tranceiver ($TRX_{in}$) coupled with the inner antenna through the antenna multiplexer. An outer base station relating to the outer cell has also a plurality of tranceivers ($TRX_{out}$) and a control channel tranceiver ($TRX_{out}$) coupled with the outer antenna through the antenna multiplexer. Those base stations are coupled with the common base station controller, and the external communication channels.

First, the structure of the cells is described in accordance with FIG. 5B, in which the numeral $10_1$ and $10_2$ are an antennas 20 is an inner cell, and 30 is an outer cell.

As shown in FIG. 5B, the tilt angle of the antenna of the inner cell base station is $\Theta_{in}$, and the tilt angle of the antenna of the outer base station is $\Theta_{out}$.

Figure 5C:
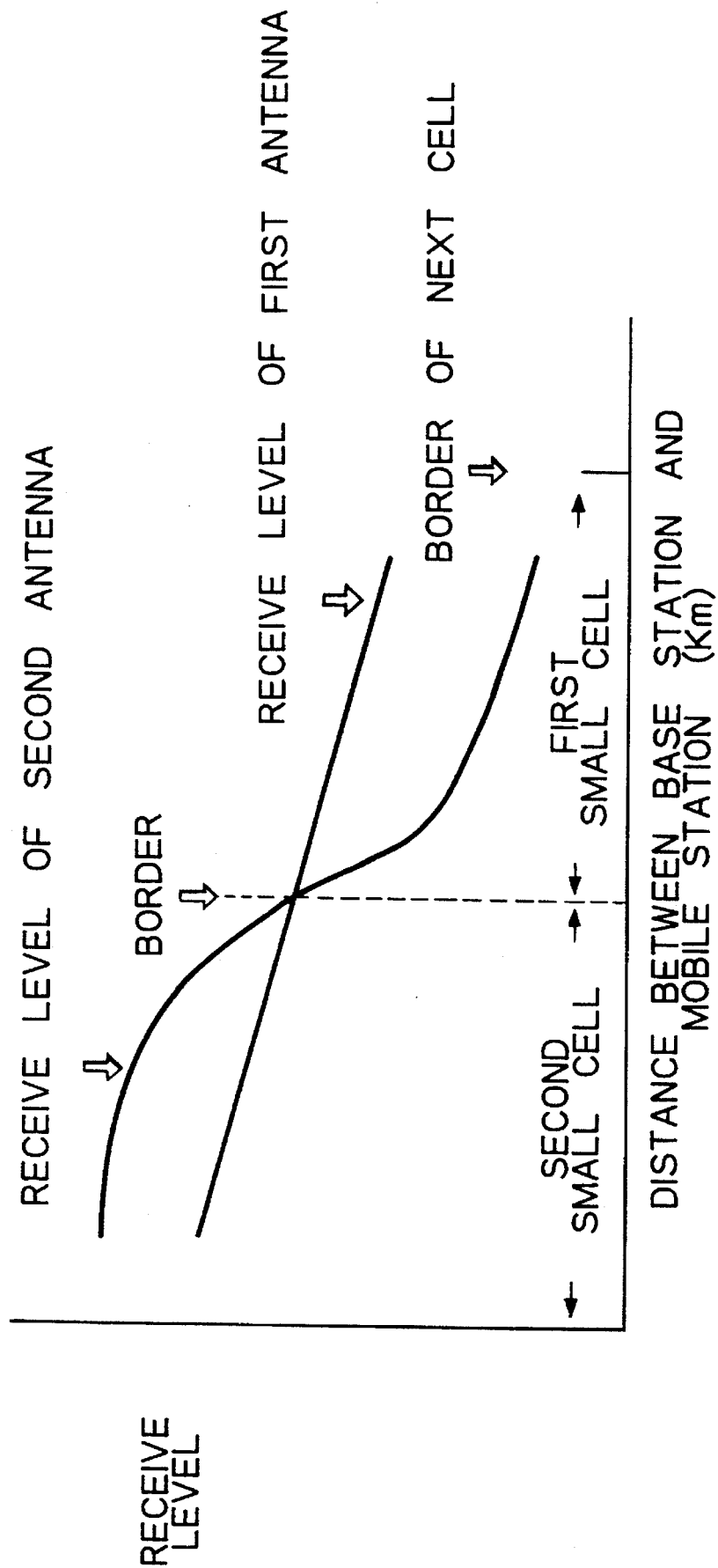

FIG. 5C shows an example of a received level when $\Theta_{in} > \Theta_{out}$ is satisfied, where it is assumed that two antennas for an inner cell and an outer cell have the same directivity (gain), the same antenna height, the same feeder loss, and the same transmit power as each other.

It should be appreciated in FIG. 5C that when the distance between a base station and a mobile station is small, the received level for the antenna with larger tilt angle is higher than that of the other antenna, and that when the distance between a base station and a mobile station is large, the received level for the antenna with the larger tilt angle is lower than that of the other antenna.

An antenna with a large tilt angle provides a high received level near a base station, since the large tilt angle antenna concentrates radiation power near the base station, as shown in FIG. 5B.

Therefore, it should be noted that two cells (an inner cell and an outer cell) which can be separated based upon the received level are essentially provided according to the tile angle of an antenna.

FIG. 5D shows a received level of an inner cell (curve A) and an outer cell (curve B). It should be noted that the border of an inner cell and an outer cell is clear, and a mobile station can select an inner cell or an outer cell accurately. Therefore, the spectrum efficiency is improved.

Figure 6A:
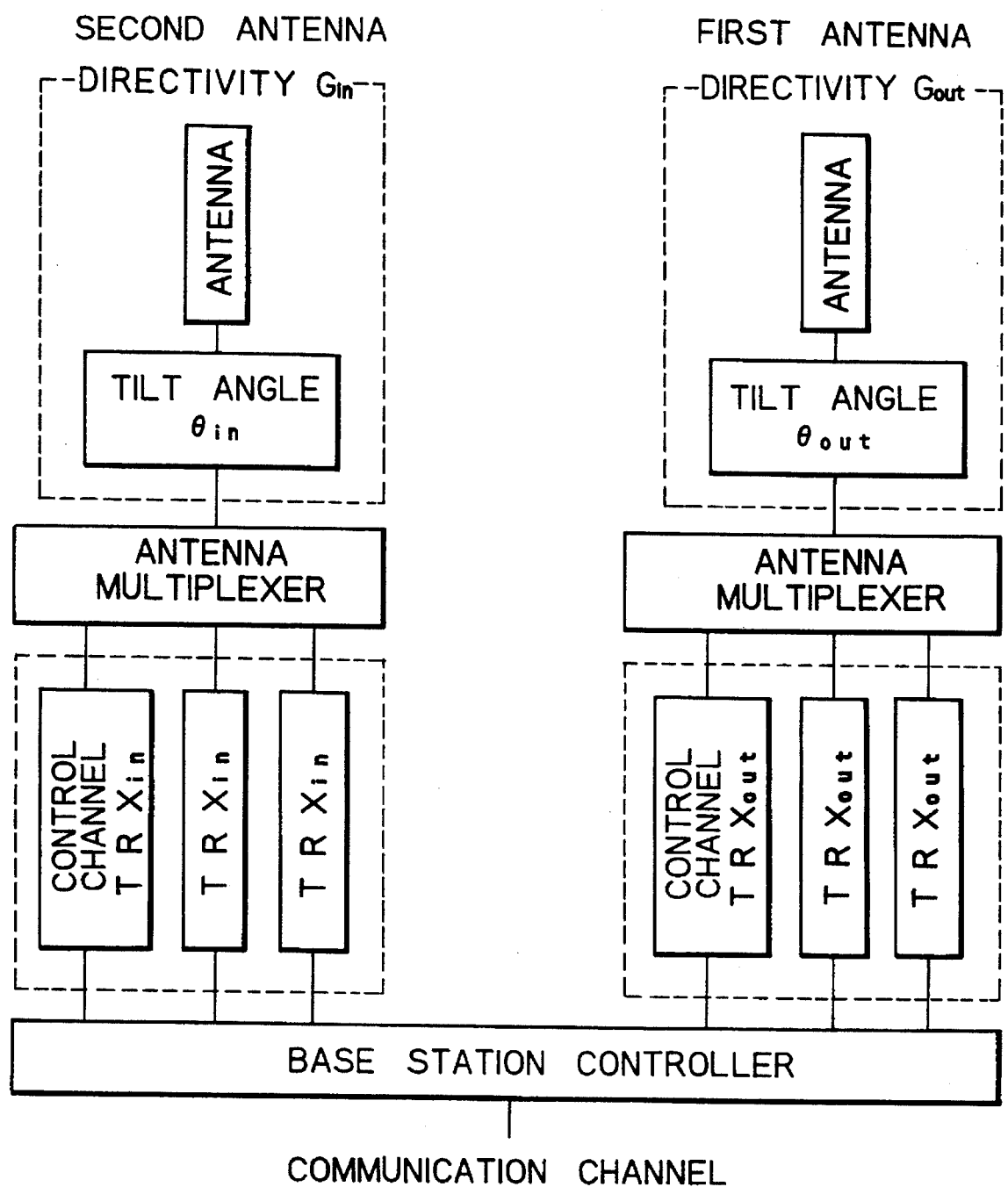
FIGS. 6A–6C show a second embodiment according to the present invention.

FIG. 6A shows a block diagram of a base station of the second embodiment according to the present invention. The feature of that embodiment is that a directivity $G_{in}$ or $G_{out}$ is obtained by tilting an antenna. An antenna with the tilt angle $\Theta_{in}$ is used for the directivity $G_{in}$, and an antenna with the tilt angle $\Theta_{out}$ is used for the directivity $G_{out}$.

Figure 6B:
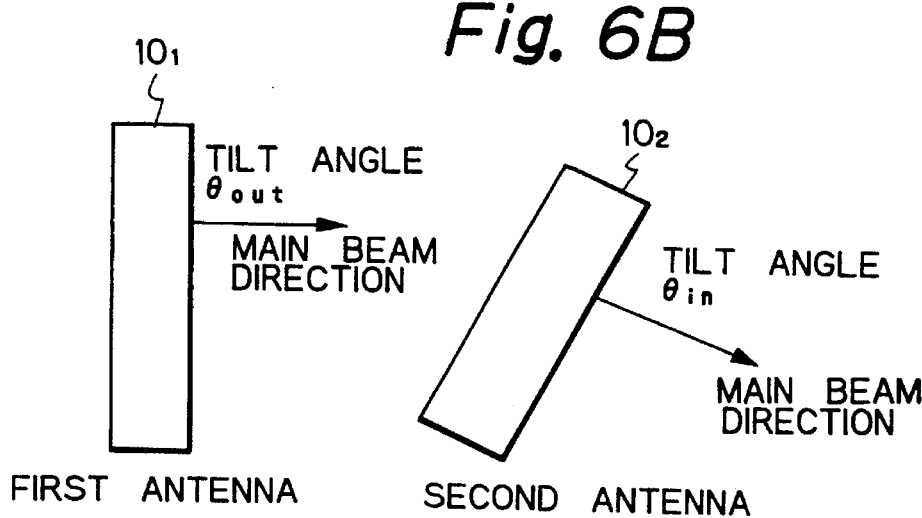

FIG. 6B shows mechanical embodiment for providing a tilt antenna. A first antenna $10_1$ has the same directivity in a vertical plane as that of a second antenna $10_2$, and the first antenna is fixed so that the main beam is directed to the direction $\Theta_{out}$, and the second antenna is fixed so that the main beam is directed to the direction $\Theta_{in}$.

Figure 6C:
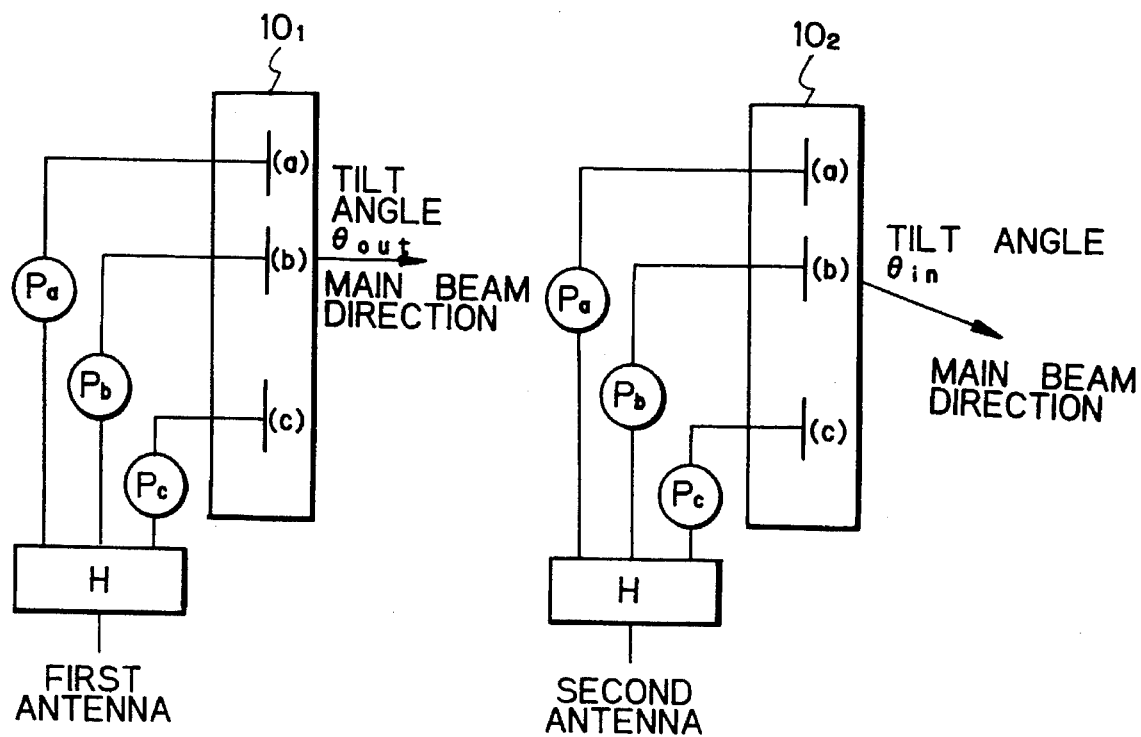

FIG. 6C shows electrical embodiment of a tilt antenna, which is a phased-array antenna, and has a plurality of antenna elements (a), (b), (c), together with related phase shifters ($P_a$, $P_b$, $P_c$) and a power divider H. The phase shifters are adjusted so that the main beam of the antenna is directed to the angle $\Theta_{out}$ or $\Theta_{in}$. The phase shift in each phase shifter is accomplished in a conventional manner, for instance, by designing the length of a feeder cable, or by using a specific phase shifter.

When the tilt angle $\Theta_{in}$ of the second antenna is large, the received level outside of an area is decreased considerably, therefore, the interval of the use of the same frequency may be shortened while keeping the area of a second small cell constant. For instance, while the interval of the reuse of the same frequency in a prior art is two cells, the interval of the present invention may be one cell. That means that the same frequency may be used in an adjacent small cell.

Figure 7A:
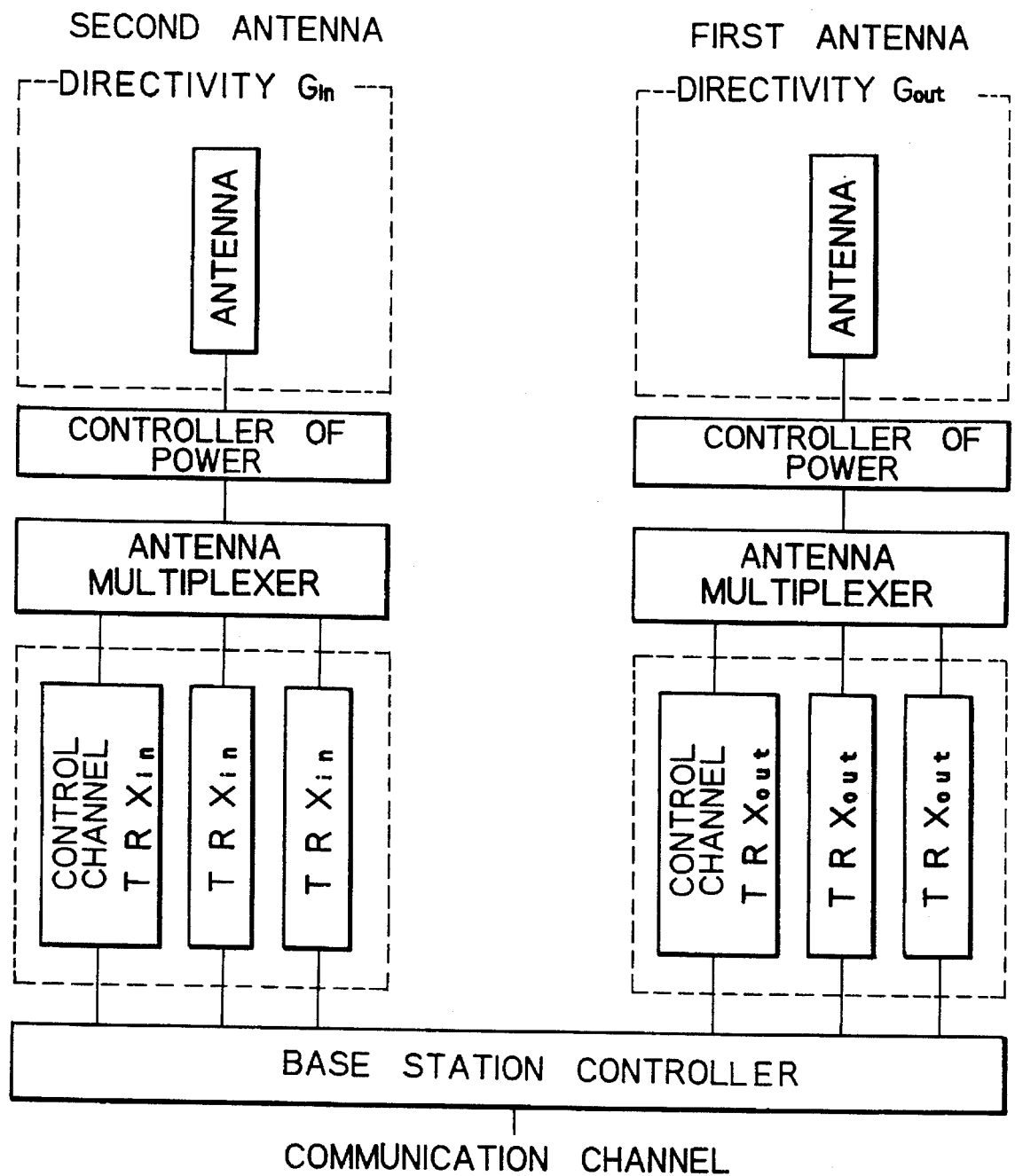
FIG. 7A–7B show a base station of a third embodiment according to the present invention.

FIG. 7A shows a block diagram of a base station of third embodiment. The feature of this embodiment as compared with that of FIG. 5A is that a power controller is, for example, provided between an antenna and an antenna multiplexer for each of a first base station and a second base station so that transmit power of a control channel and a speech channel are controllable. The adjustment of transmit power is effected either for each transmitter, or for all the transmitters of all the speech channels and the control channel. FIG. 7A shows the embodiment that the transmit power of all the transmitters is adjusted at the same time.

Figure 7B:
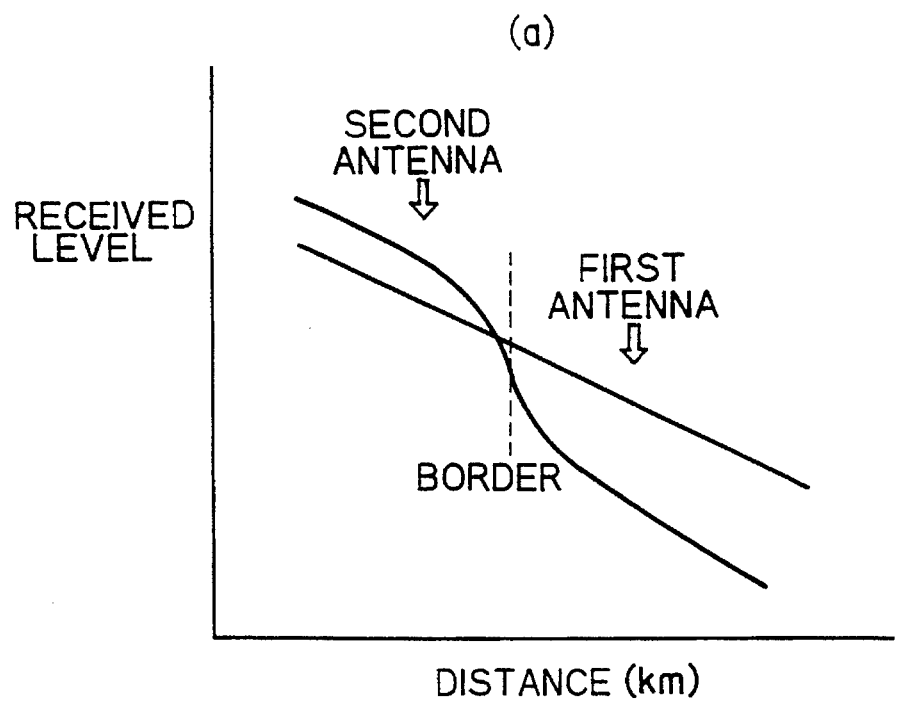
Figure 7B:
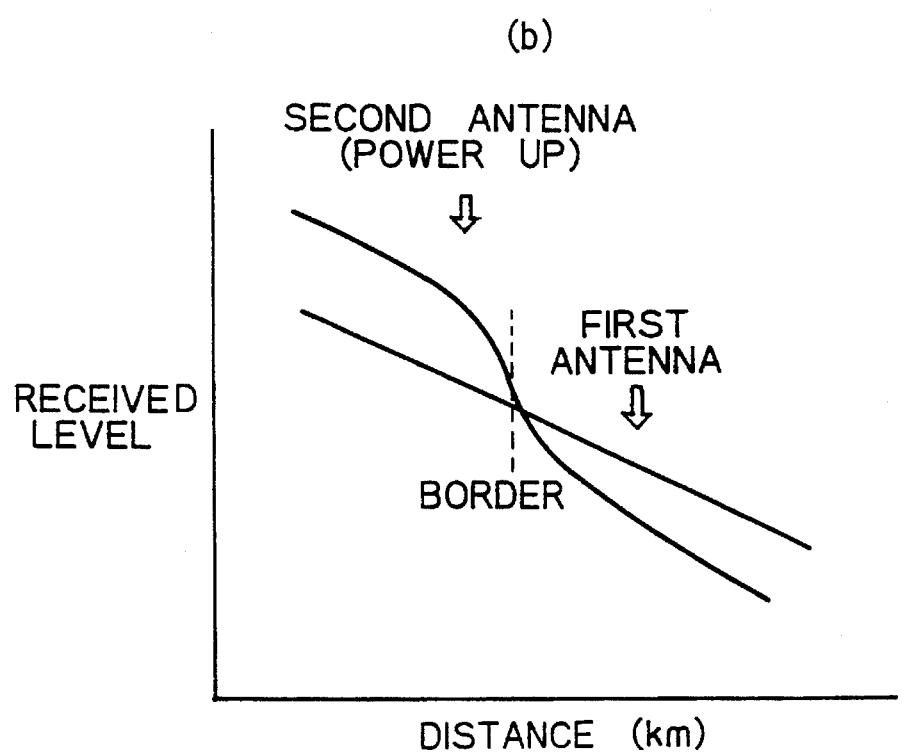

When the border of a first small cell and a second small cell is unclear as shown in FIG. 7B(a) in which the received level of a first antenna is close to that of a second antenna around the border, the transmit power of the second antenna is adjusted so that it is higher than that of the first antenna. Then, the received level of the first antenna is clearly distinguished from that of the second antenna, as shown in FIG. 7B(b).

Thus, it should be noted that the adjustment of transmit power clarifies the difference of the received level of the first antenna from that of the second antenna around the border. Therefore, the selection of a cell is carried out accurately, and the frequency may be used effectively.

Of course, it should be appreciated that the idea of FIGS. 7A–7B may be used in the embodiment of FIGS. 6A–6C.

Figure 8:
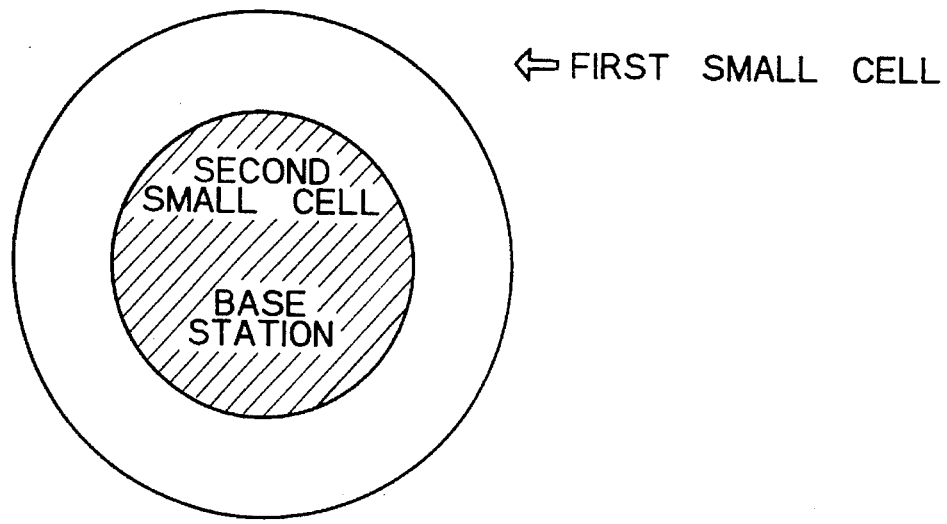
FIG. 8 shows a cell of a fourth embodiment according to the present invention.

FIG. 8 shows a structure of small cells, in which the horizontal directivity of a first small cell and a second small cell is provided by using a non-directional (in horizontal plane) antenna, or an omni-antenna. A second small cell overlays with a first small cell, and is provided within the first small cell.

Figure 9:
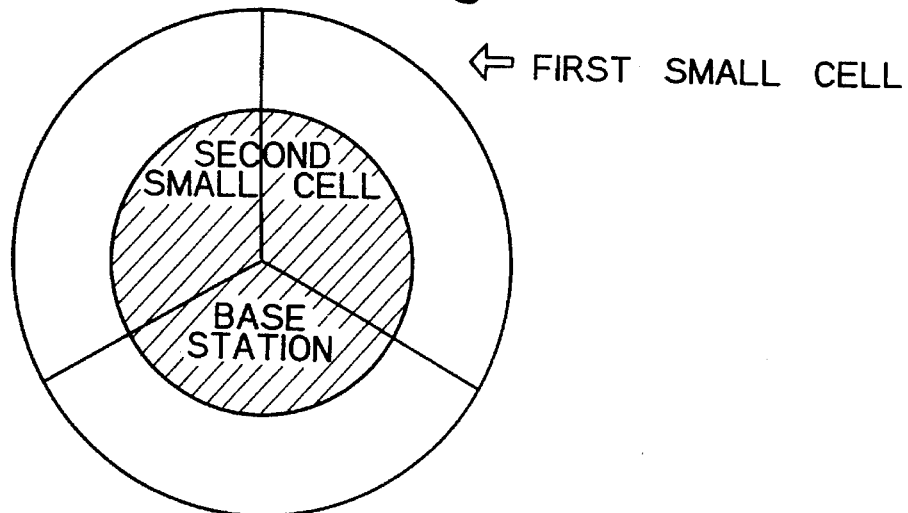
FIG. 9 shows a cell of a fifth embodiment according to the present invention.

FIG. 9 shows another structure of small cells, in which both a first antenna and a second antenna are directional antennas in a horizontal plane. FIG. 9 shows the embodiment that both antennas are sector antennas of 120°. A second small cell may overlay with a first small cell, and is provided within the first small cell.

Figure 10:
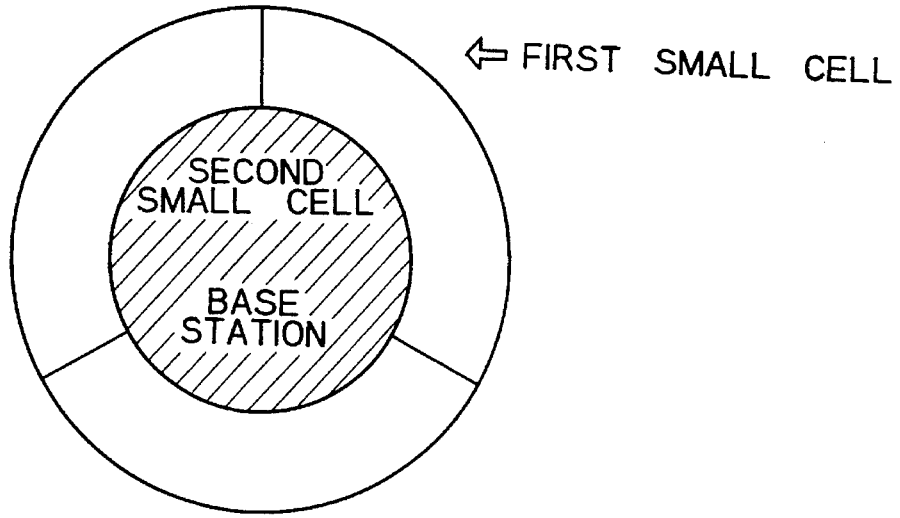
FIG. 10 shows a cell of a sixth embodiment according to the present invention.

FIG. 10 shows still another structure of small cells, in which a first small cell is provided by a directional antenna (for instance a sector antenna), and a second small cell is provided by a non-directional antenna (omni-antenna). A second small cell may overlay with a first small cell, and is provided within the first small cell. As a second small cell is smaller than a first small cell, when a second small cell is provided by a non-directional antenna, the number of hand-over of cells in a mobile station may be small because the crossing rate among the sectored cells is reduced when a mobile station moves around a base station.

Figure 11:
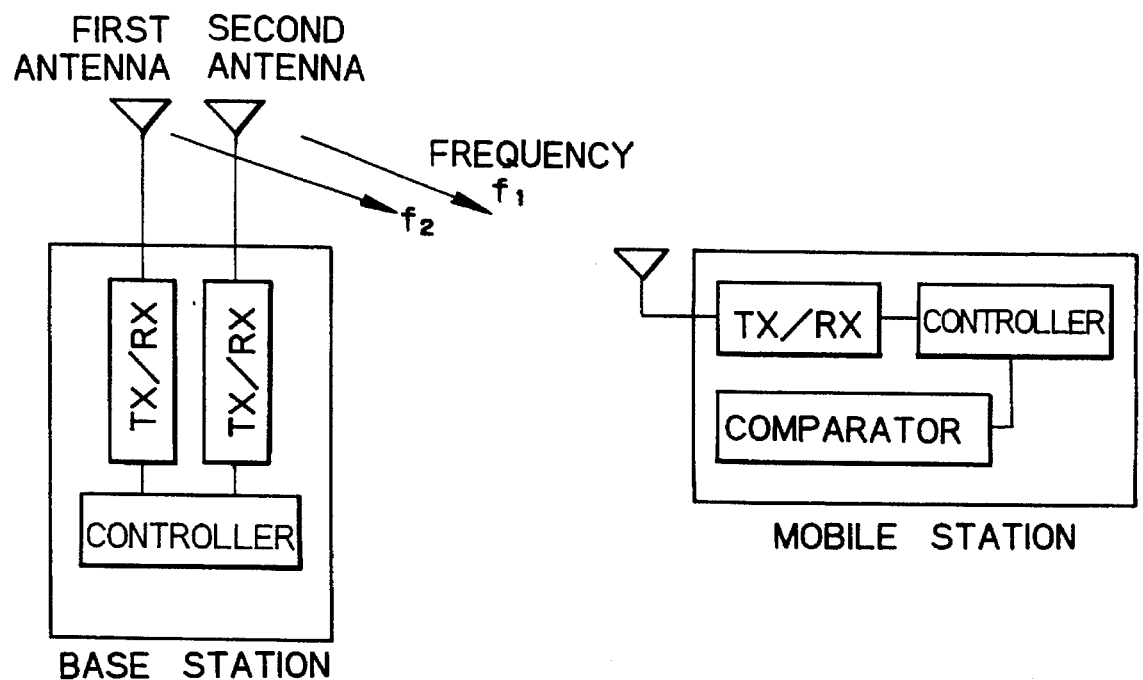
FIG. 11 shows a system configuration of another embodiment according to the present invention.

FIG. 11 shows a modification of the present invention. The feature of FIG. 11 is that the selection of small cells is carried out in a mobile station by comparing two received levels of two speech channels or control channels. So, a mobile station has a comparator, which compares a first received level of a first frequency $f_1$ and a second received level of a second frequency $f_2$ so that the small cell which provides a higher received level is selected.

Figure 12:
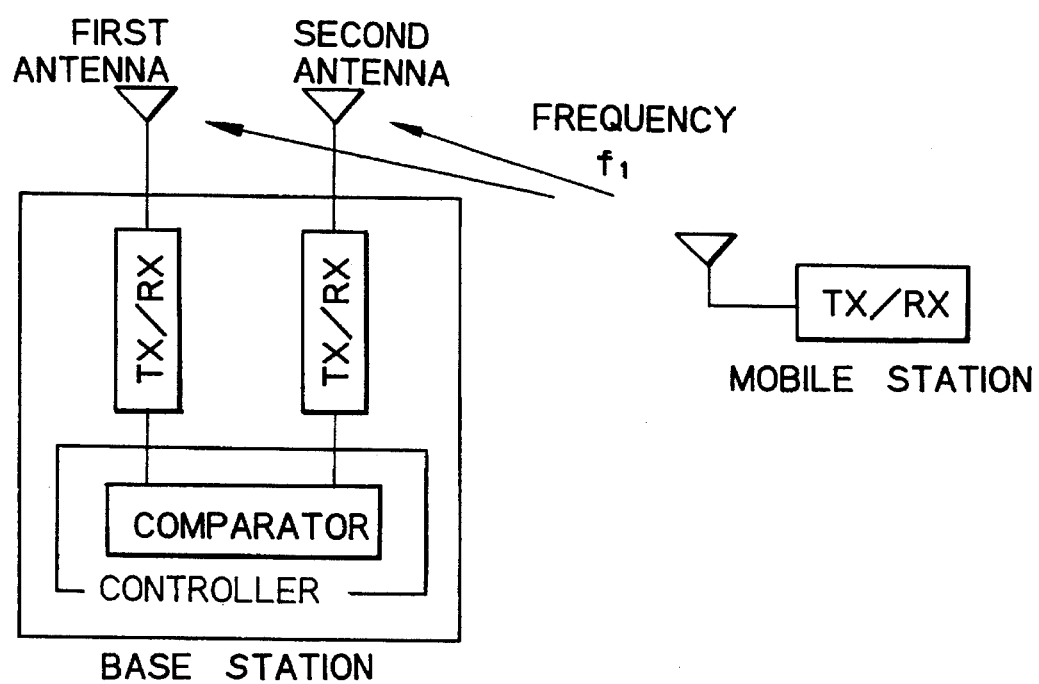
FIG. 12 shows a system configuration of still another embodiment according to the present invention.

FIG. 12 shows another modification of the present invention. The feature of FIG. 12 is that the selection of small cells is carried out in a base station by comparing a received level of a control channel or a speech channel. A mobile station transmits a single frequency $f_1$, and a base station receives by using two antennas, a first antenna relating to a first small cell, and a second antenna relating to a second small cell. A comparator in a controller in a base station compares those two receive levels, and takes the higher received level so that the small cell which provides the higher received level is selected. The embodiment of FIG. 12 is advantageous in that a control channel may be common to both a first small cell and a second small cell, and therefore, the spectrum efficiency for a control channel is improved.

Figure 13:
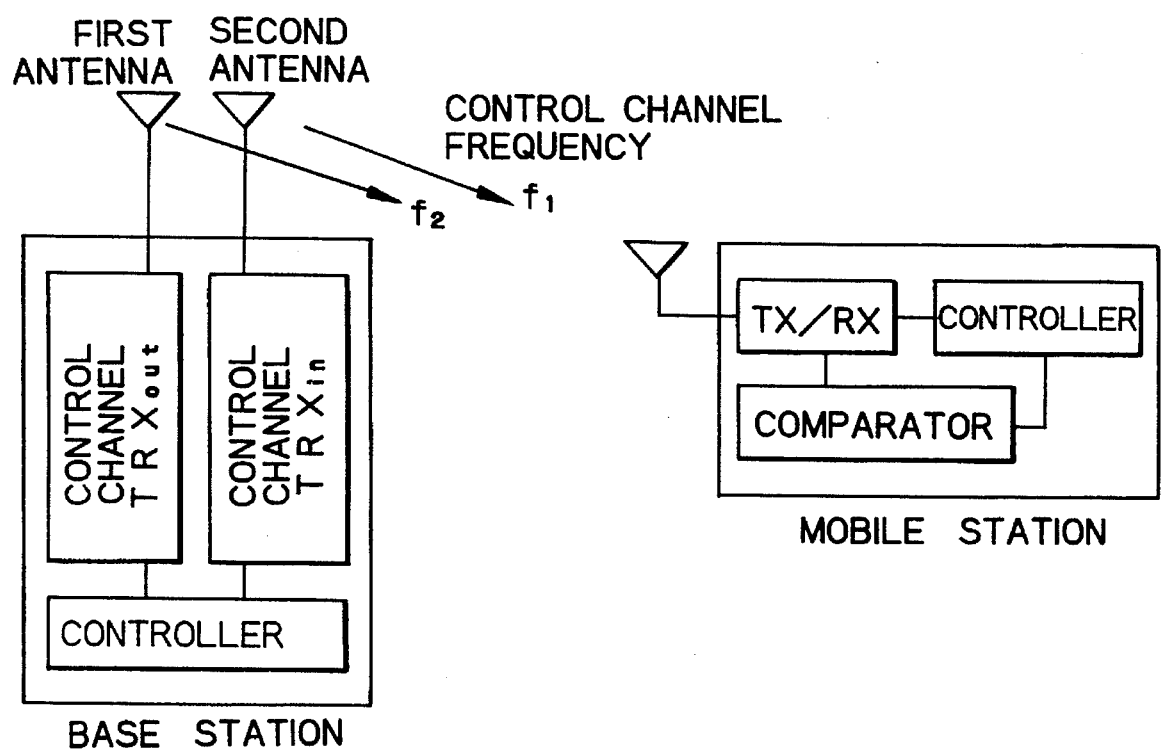
FIG. 13 shows a system configuration of still another embodiment according to the present invention.

FIG. 13 shows still another modification of the present invention. The feature of FIG. 13 is that the selection of small cells is carried out by a mobile station by comparing two received levels of control channels of the frequencies $f_1$ and $f_2$. A mobile station has a comparator for that purpose.

Figure 14A:
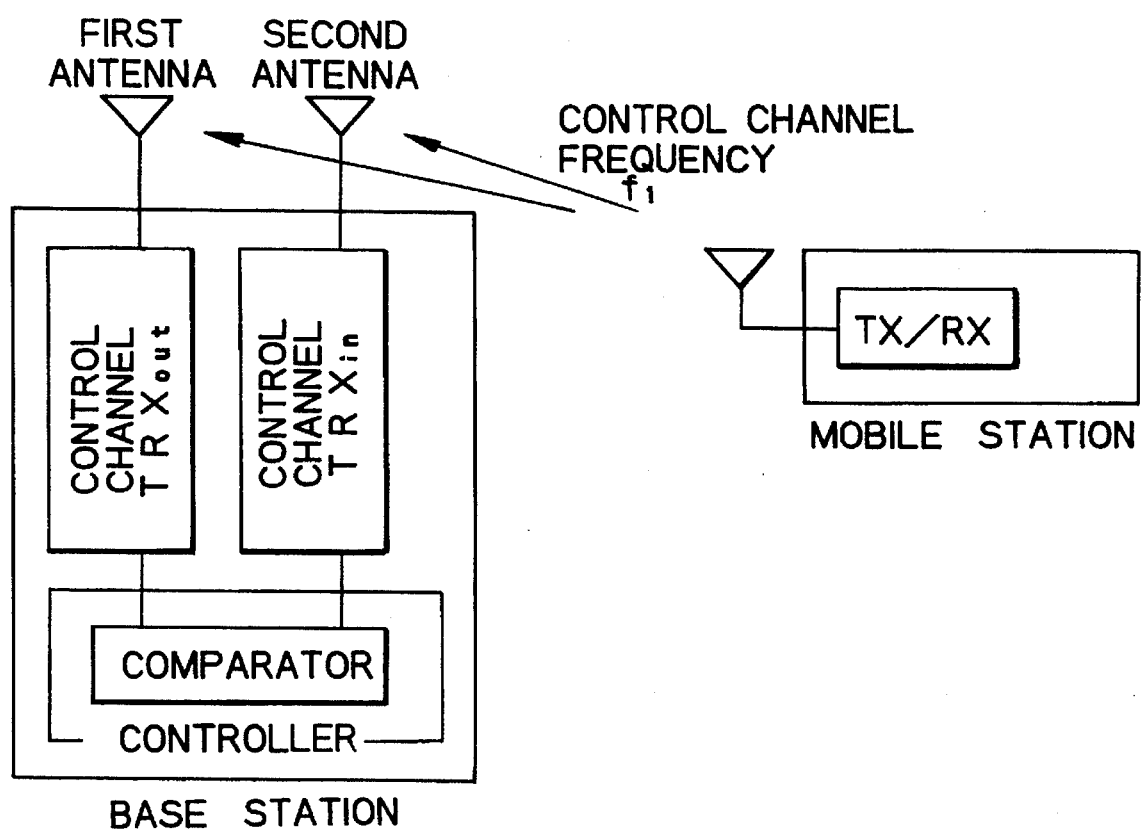
FIG. 14A–14C show still another embodiment according to the present invention.

FIG. 14A shows still another modification of the present invention. The feature of this embodiment is that the selection of small cells is carried out by a base station which compares received levels of control channels. A mobile station transmits a single frequency $f_1$ as a control channel, which is received by using two antennas in a base station. The received level by a first antenna and the receive level by a second antenna are compared in a comparator in a controller of a base station, and the higher received level relating to a preferable small cell is selected.

Figure 14B:
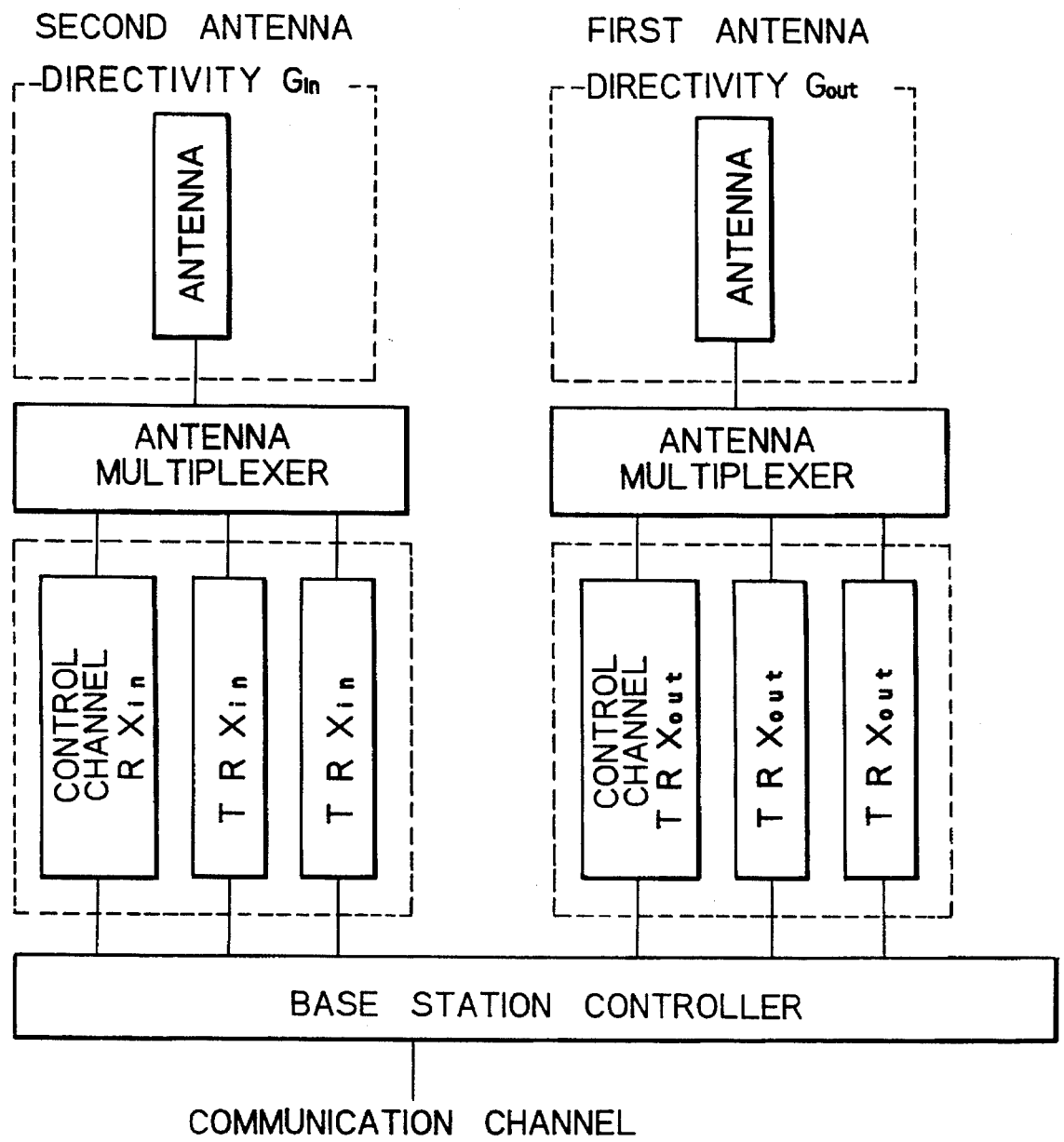

FIG. 14B is the modification of a base station of this embodiment, and has the feature that a base station has a common control channel transmitter which is provided for a first antenna to cover all the small cells, and a plurality of control channel receivers for each small cells.

Figure 14C:
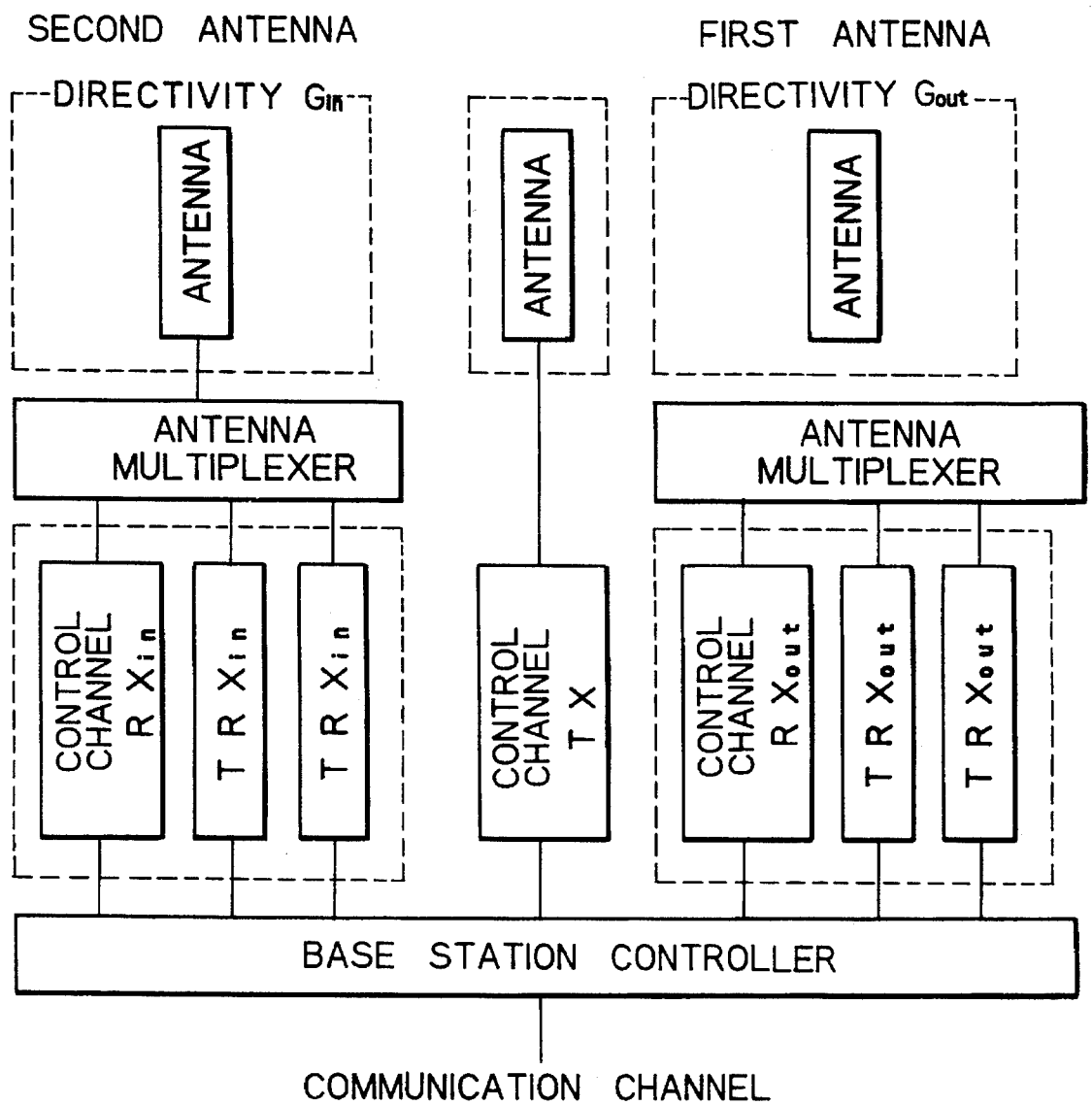

FIG. 14C is another modification of a base station, and has the feature that a transmitter (TX) for a control channel is provided, and a receiver ($RX_{in}$, $RX_{out}$) for a control channel is provided for each of a first antenna and a second antenna.

As a control channel is common to a first small cell and a second small cell, the spectrum efficiency of a control channel is improved in this embodiment.

Figure 15:
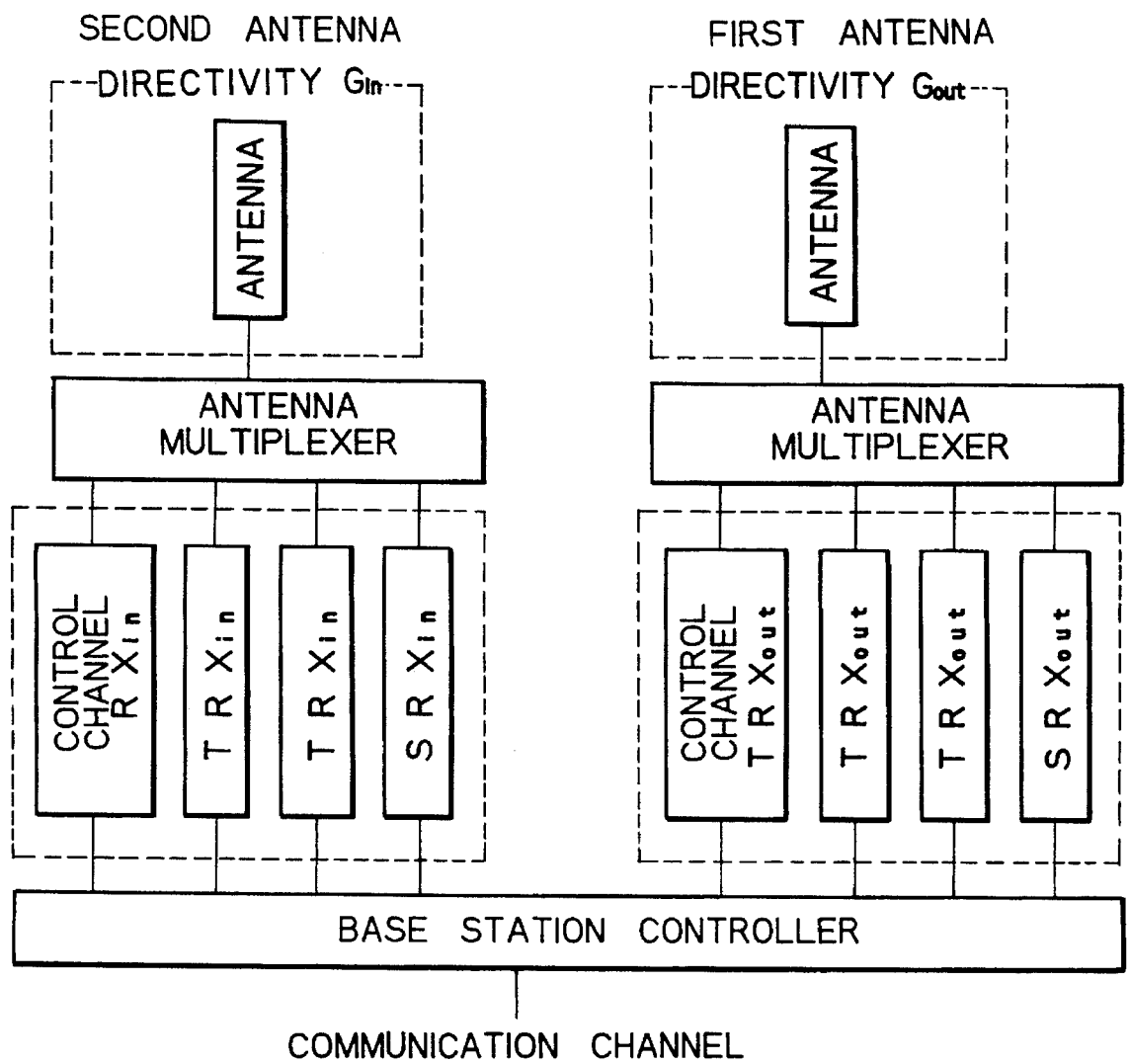
FIG. 15 shows a base station of still another embodiment according to the present invention.

FIG. 15 shows a base station of still another embodiment according to the present invention, and has the feature that a base station has a pair of additional receivers $SRX_{in}$ and $SRX_{out}$. The former receiver measures the received level of a speech channel in an outer small cell, and the latter receiver measures the received level of a speech channel in an inner small cell. The controller of a base station compares the received level of the current small cell with the received level measured by the SRX to determine the location of a mobile station. For instance, if the SRX level by a second antenna is higher than a received level by a first antenna for a speech channel, the base station determines that the mobile station moves from a first small cell to a second small cell, and that hands over from a first small cell to a second small cell.

Figure 16A:
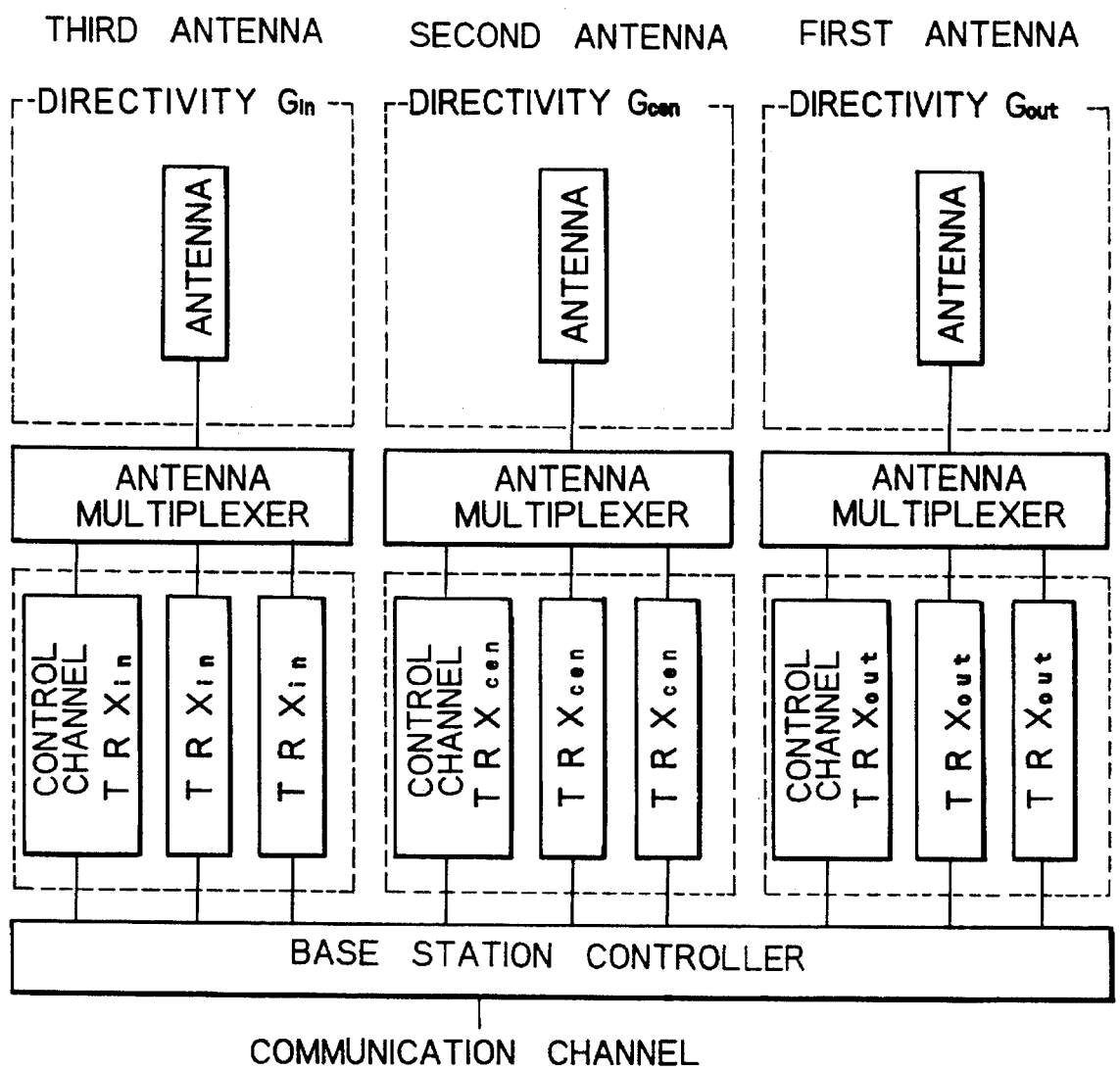
Figure 16B:
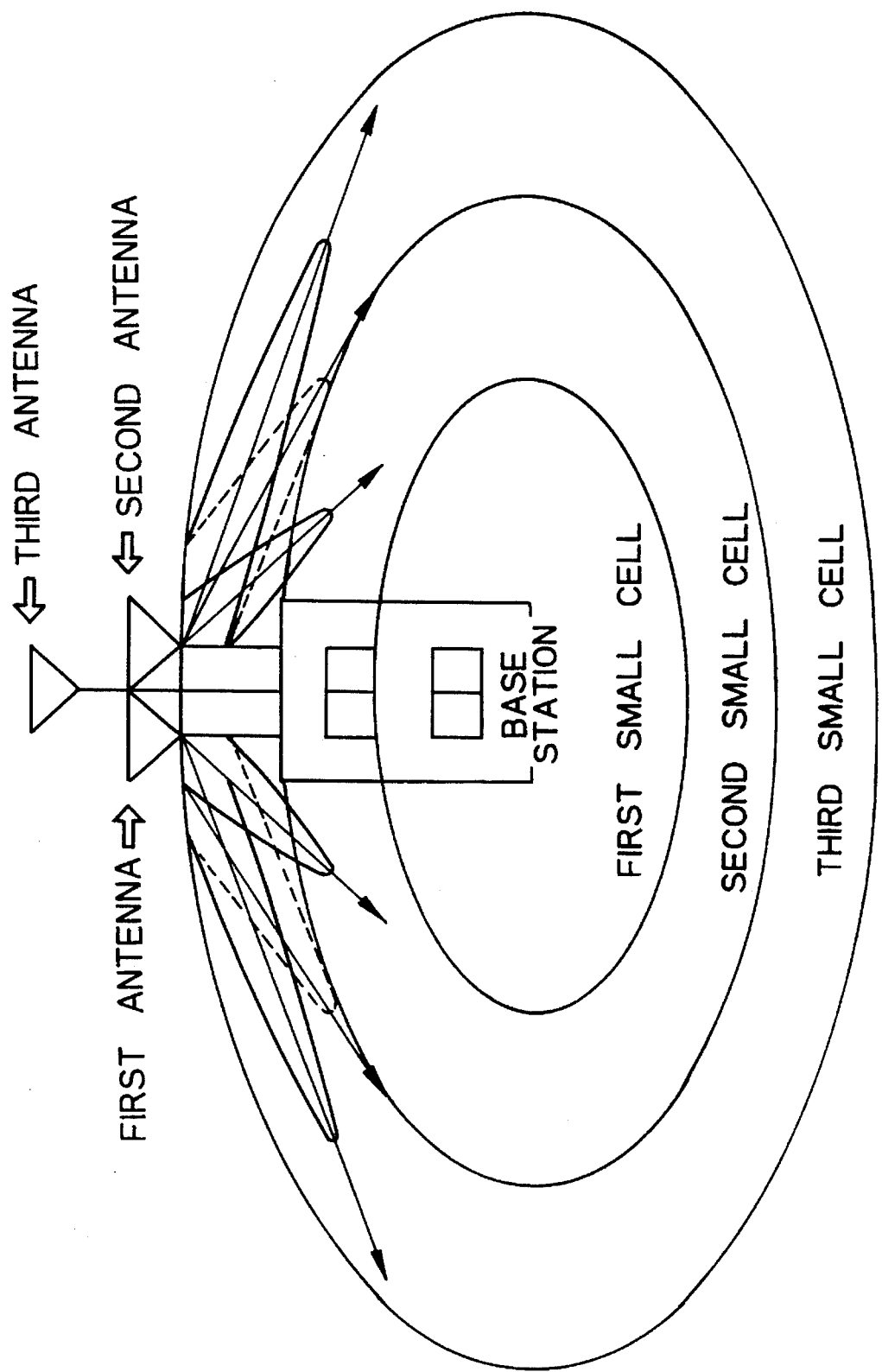

FIGS. 16A, 16B and 16C show still another embodiment of the present invention, and have the feature that a third small cell relating to a third antenna is provided within a second small cell. As the third small cell may use the same frequency with the interval shorter than that of a second small cell, the spectrum efficiency is further improved.

Figure 17:
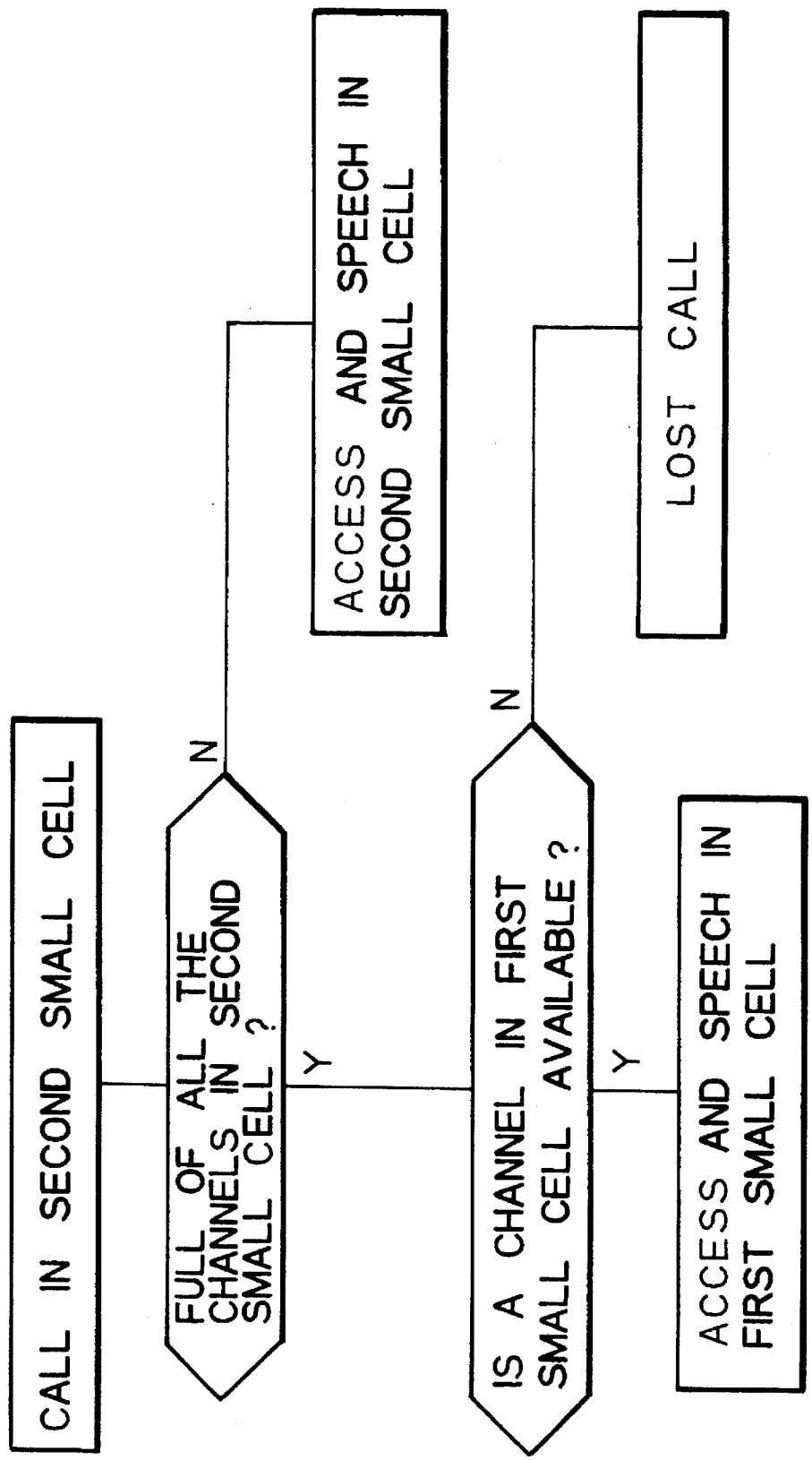
FIG. 17 shows a control flow in still another embodiment according to the present invention.

FIG. 17 is an operational flow chart of still another embodiment according to the present invention. The feature of FIG. 17 is that a mobile station staying in a second small cell uses a channel which is assigned to a first small cell, when all the channels assigned to a second small cell are full. It should be noted that this is no problem in interference, and it can solve the problem of a short time busy condition.

Figure 18:
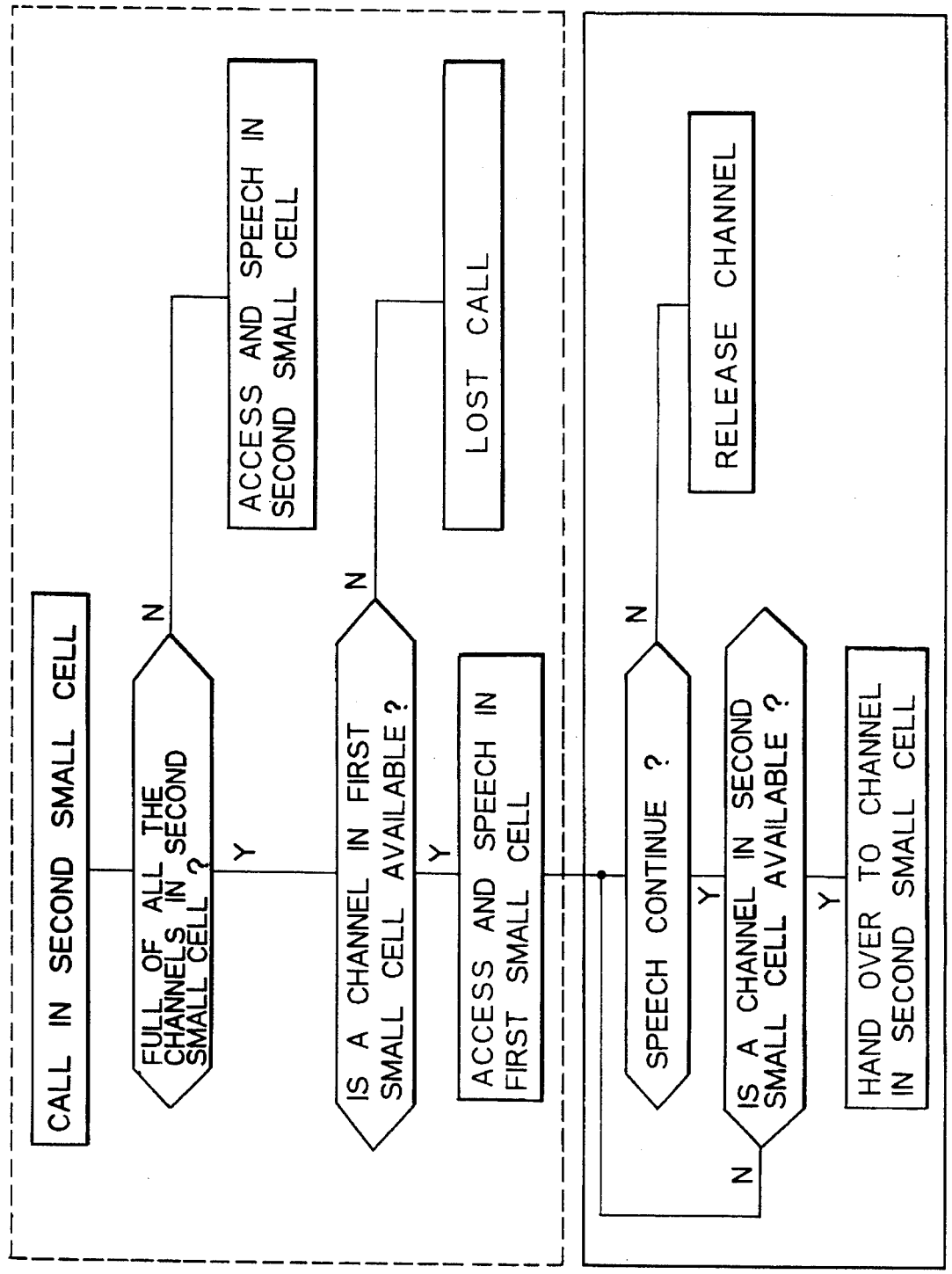
FIG. 18 shows a control flow in still another embodiment according to the present invention.

FIG. 18 shows the modification of the embodiment of FIG. 17, and the feature of FIG. 18 is that when a mobile station staying in a second small cell uses a channel assigned to a first small cell according to the embodiment of FIG. 17, and a channel in a second small station becomes available, the mobile station is handed over from the first small cell channel to the second small cell channel. This provides the desirable interval of the use of the same frequency as expected to second small cells. The combination of the channel switching by hand-over, and the busy control in the present embodiment provides not only the improvement of a re-use partition on a spatial domain, but also the improvement of a re-use partition on a time domain.

Figure 19:
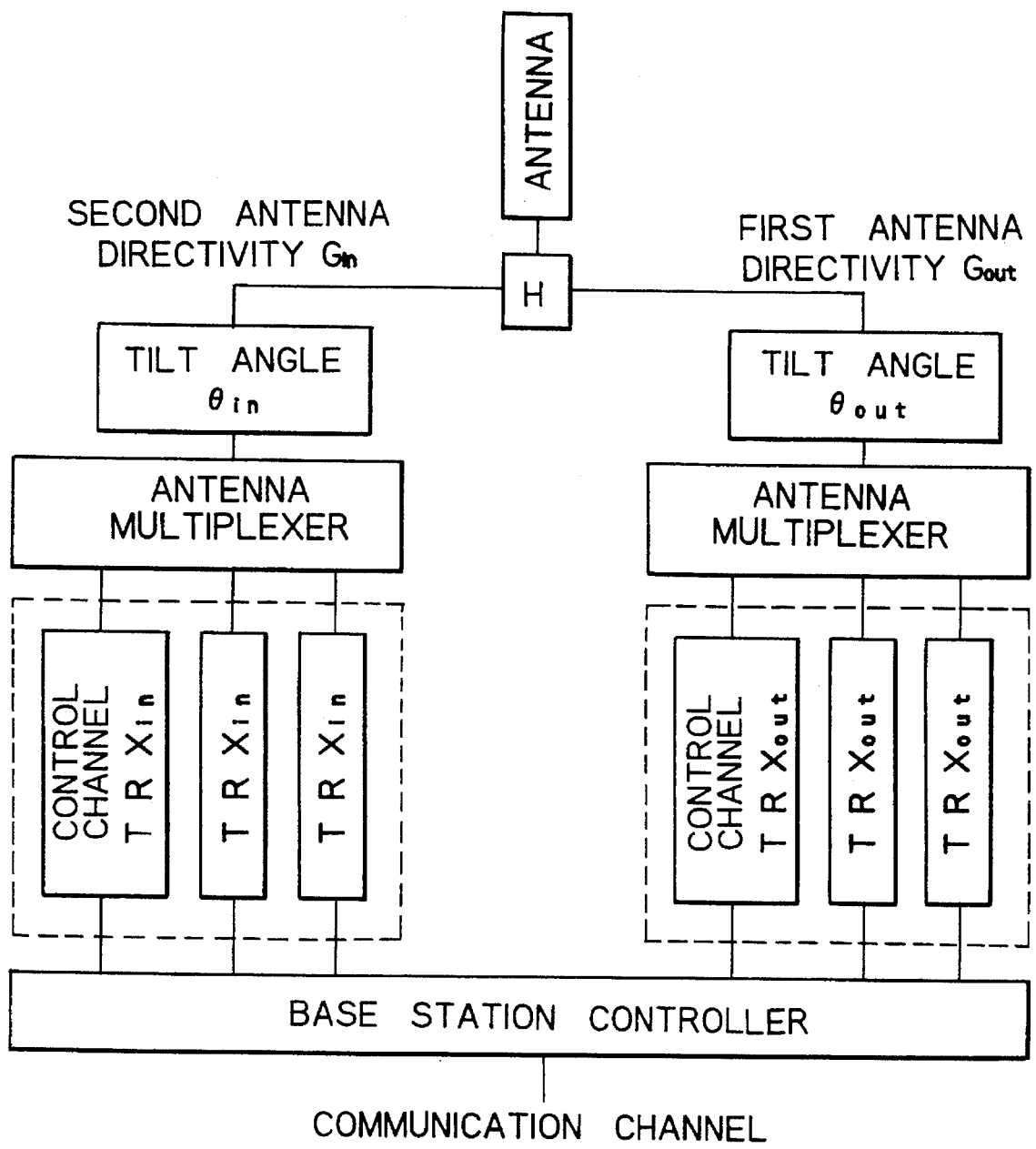
FIG. 19 shows a base station which simplifies an antenna structure.

FIG. 19 shows a block diagram of a base station of still another embodiment, and has the feature that a single antenna is used commonly to both a first antenna and a second antenna by coupling the single antenna with two tranceivers for a first small cell and a second small cell.

Figure 20:
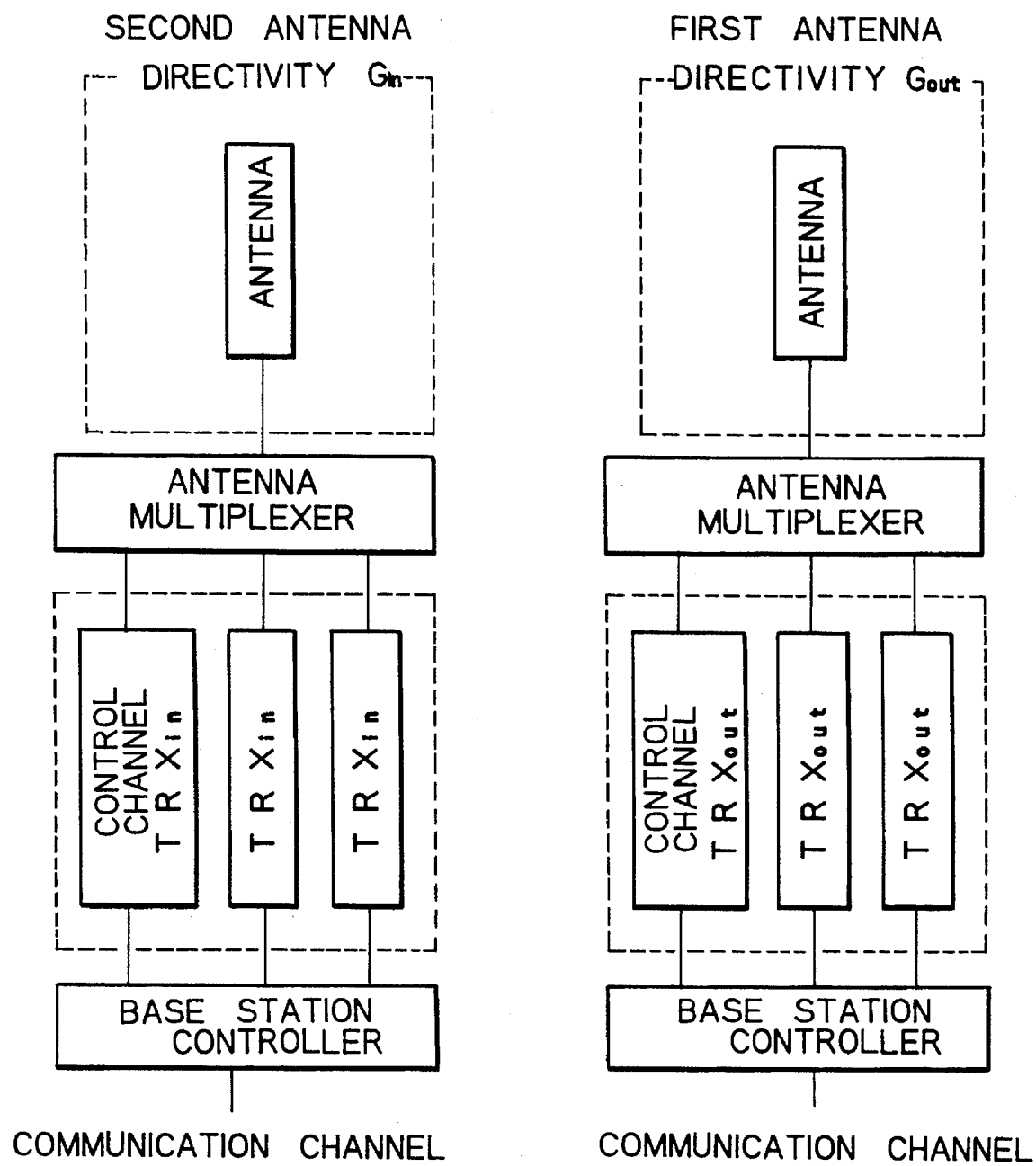
FIG. 20 shows a base station which provides each small cells independently.

FIG. 20 shows a block diagram of a base station of still another embodiment of the present invention, and has the feature that a control in a base station is provided for each small cells. In this case, each small cell base station located on the same location functions as an independent base station.

As mentioned above in detail, according to the present invention, a base station includes a plurality of small base stations each having a specific antenna tilt angle and/or specific transmit power, providing a specific small cell. Thus, an inner cell is provided independently from an outer cell so that the spectrum efficiency in an inner cell is higher than that of an outer cell. The present invention can locate a mobile station more accurately in an outer cell or an inner cell as compared with a prior art which locates a mobile station merely according to a receive level with no tilted antenna.

From the foregoing it will now be apparent that a new and improved mobile communication system has been found. It should be understood of course that the embodiments disclosed are merely illustrative and are not intended to limit the scope of the invention. Reference should be made to the appended claims, therefore, for indicating the scope of the invention rather than the specification.

What is claimed is:

1. A mobile communication system having a plurality of radio cells for a service area so that each radio cell is assigned a respective channel, and a same channel is used in a plurality of radio cells which are apart from each other by more than a predetermined distance, said mobile communication system comprising:

a first cell provided in one of said radio cells, said first cell accessed by a first antenna provided in a base station, said first antenna having a first vertical directivity;

a second cell provided in said one of said radio cells, said second cell is smaller than said first cell, said second cell being provided within said first cell and being concentric and overlapped by said first cell and said second cell is accessed by a second antenna which is provided in said base station, said second antenna having a second vertical directivity which is different from said first antenna, wherein a cell area, in which said same channel is used in said second cell, is smaller than a cell area that said same channel is used in said first cell, and wherein each cell having a respective channel; and each cell including a control channel transceiver means for controlling each respective cell, wherein communication between a mobile station and said base station being effected through a channel having a higher signal received level in one of a communication channel and a control channel.

2. A mobile communication system according to claim 1, wherein each of said first antenna and said second antenna is a beam tilt antenna having a respective beam tilt angle.

3. A mobile communication system according to claim 2, wherein effective input power to said first and second antennas depends upon each antenna for each cell.

4. A mobile communication system according to claim 1, wherein said first cell and said second cell are in omni-structure.

5. A mobile communication system according to claim 1, wherein said first cell and said second cell are in sector structure.

6. A mobile communication system according to claim 1, wherein said first cell is in sector structure, and said second cell is in omni-structure.

7. A mobile communication system according to claim 1, wherein comparison of received levels of two channels relating to each cell and selection of cells are carried out in said mobile station.

8. A mobile communication system according to claim 7, wherein said selection of cells is effected based upon received level of said control channel provided for each cell.

9. A mobile communication system according to claim 1, wherein comparison of received levels of two channels relating to each cell and selection of cells are carried out in said base station.

10. A mobile communication system according to claim 9, wherein said selection of cells is effected in said base station based upon said higher received level of said control channel which is common to each cell.

11. A mobile communication system according to claim 9, wherein said selection of cells is effected in said base station based upon said higher received level of a speech channel.

12. A mobile communication system according to claim 1, further comprising a third antenna provided in a third cell within and concentric and overlapped by said second cell, a respective communication channel and a control channel are provided in said third cell, and communication is carried out by using the highest received level of the channels within the three cells.

13. A mobile communication system according to claim 1, wherein when all the channels in said second cell are full and some of the channels in said first cell are available, a channel in said first cell is assigned to said mobile station which stays in said second cell.

14. A mobile communication system according to claim 13, wherein said mobile station which stays in said second cell, and is assigned a speech channel of said first cell, hands over said speech channel to that of said second cell, when a channel in said second cell becomes available.

15. A mobile communication system according to claim 1, wherein said first and second antennas are sector antennas.

16. A mobile communication system according to claim 1, wherein said first antenna is a directional antenna and said second antenna is a non-directional antenna.

17. A mobile communication system according to claim 1, wherein said first antenna is a sector antenna and said second antenna is an omni-antenna.

* * * * *

UNITED STATES PATENT AND TRADEMARK OFFICE
CERTIFICATE OF CORRECTION

PATENT NO. : 5,551,060
DATED : August 27, 1996
INVENTOR(S) : Fujii, et al

Page 1 of 4

It is certified that error appears in the above-identified patent and that said Letters Patent is hereby corrected as shown below:

The title page, showing the illustrative figure, should be deleted and substitute therefor the attached title page.

Signed and Sealed this

First Day of July, 1997

Attest:

BRUCE LEHMAN

Attesting Officer

Commissioner of Patents and Trademarks

United States Patent [19]
Fujii et al.

[11] Patent Number: 5,551,060
[45] Date of Patent: Aug. 27, 1996

[54] STRUCTURE OF CELLS WITHIN A MOBILE COMMUNICATION SYSTEM

[75] Inventors: Teruya Fujii; Masayuki Sakamoto, both of Kanagawa, Japan

[73] Assignee: Nippon Telegraph and Telephone Corporation, Tokyo, Japan

[21] Appl. No.: 936,450

[22] Filed: Aug. 28, 1992

[30] Foreign Application Priority Data

Sep. 3, 1991 [JP] Japan .................................. 3-248413

[51] Int. Cl.$^6$ .................................................. H04B 7/00
[52] U.S. Cl. .................. 455/33.4; 455/33.1; 455/33.3; 455/54.1; 455/62; 379/59; 343/890
[58] Field of Search ........................ 455/33.1, 33.2, 455/33.3, 33.4, 54.1, 54.2, 56.1, 62, 101, 129; 343/890, 891; 379/58, 59, 60

[56] References Cited

U.S. PATENT DOCUMENTS

| | | | |
|---|---|---|---|
| 4,128,740 | 12/1978 | Graziano | 455/33.3 |
| 4,144,411 | 3/1979 | Frenkiel | 455/33.3 |
| 4,144,496 | 3/1979 | Cunningham et al. | 455/33.3 |
| 4,242,538 | 12/1980 | Ito et al. | |
| 4,249,181 | 2/1981 | Lee | 455/33.3 |
| 4,947,452 | 8/1990 | Hattori et al. | 455/33.3 |
| 5,119,501 | 6/1992 | Perry et al. | 455/33.3 |
| 5,230,081 | 7/1993 | Yamada et al. | 455/54.1 |
| 5,276,907 | 1/1994 | Meidan | 455/33.3 |

FOREIGN PATENT DOCUMENTS 0297062  12/1988  Japan .

OTHER PUBLICATIONS

Patent Abstracts of Japan, vol. 005, No. 137 JP-A-56 072 547.

E. W. Beddoes, Electronics and Communication Engineering Journal, "Uk Cellular Radio Developments", vol. 3, No. 4, Aug. 1991, pp. 149–158.

P. T. Porter, IEEE Transaction on Vehicular Technology, "Superviosion and Control Features of a Small-Zone Radiotelephone System", vol. 20, No. 3, Aug. 1979, pp. 75–79.

Patent Abstracts of Japan, vol. 016, No. 236, JP-A-40 47 722.

Patent Abstracts of Japan, vol. 016, No. 031, JP-A-32 44 224.

"Reuse Partitioning in Cellular Systems", Halpern, 33rd IEEE Vehicular Technology Conference, May 25–27, 1983, pp. 322–327.

*Primary Examiner*—Andrew Faile
*Assistant Examiner*—Doris To
*Attorney, Agent, or Firm*—Nikaido, Marmelstein, Murray & Oram LLP

[57] ABSTRACT

A re-use partition of cells in a mobile communication system has an outer cell (30) and an inner cell (20) which is provided in the outer cell (30). An interval of cells using the same channel or the same frequency in the inner cells is shorter than an interval in the outer cells, which is the nature of a re-use partition. Communication between a base station and a mobile station is carried out by using a channel having a higher received level of an outer cell channel or an inner cell channel. A base station has a first beam tilt antenna having tilt angle ($\Theta_{out}$) for an outer cell (30), and a second beam tilt antenna having tilt angle ($\Theta_{in}$) so that $\Theta_{in}$ is larger than $\Theta_{out}$. A speech channel and a control channel are provided for each of the first antenna and the second antenna.

17 Claims, 25 Drawing Sheets

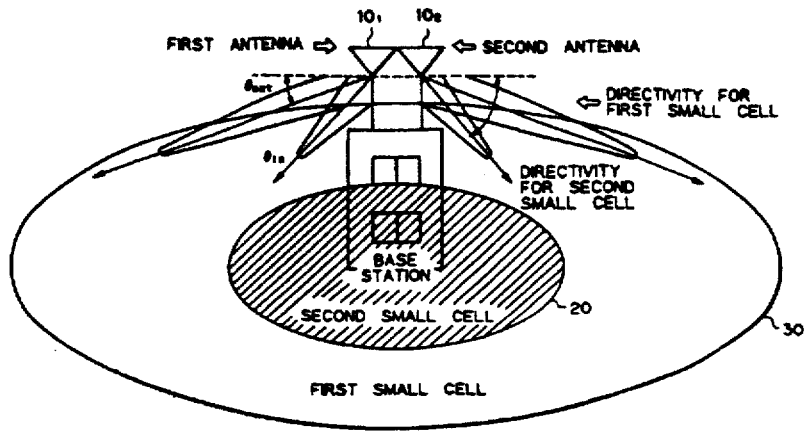

UNITED STATES PATENT AND TRADEMARK OFFICE
CERTIFICATE OF CORRECTION

PATENT NO. : 5,551,060
DATED : August 27, 1996
INVENTOR(S) : Fujii et al.

It is certified that error appears in the above-indentified patent and that said Letters Patent is hereby corrected as shown below:

Please delete Fig. 5B and substitute new Fig. 5B as follows:

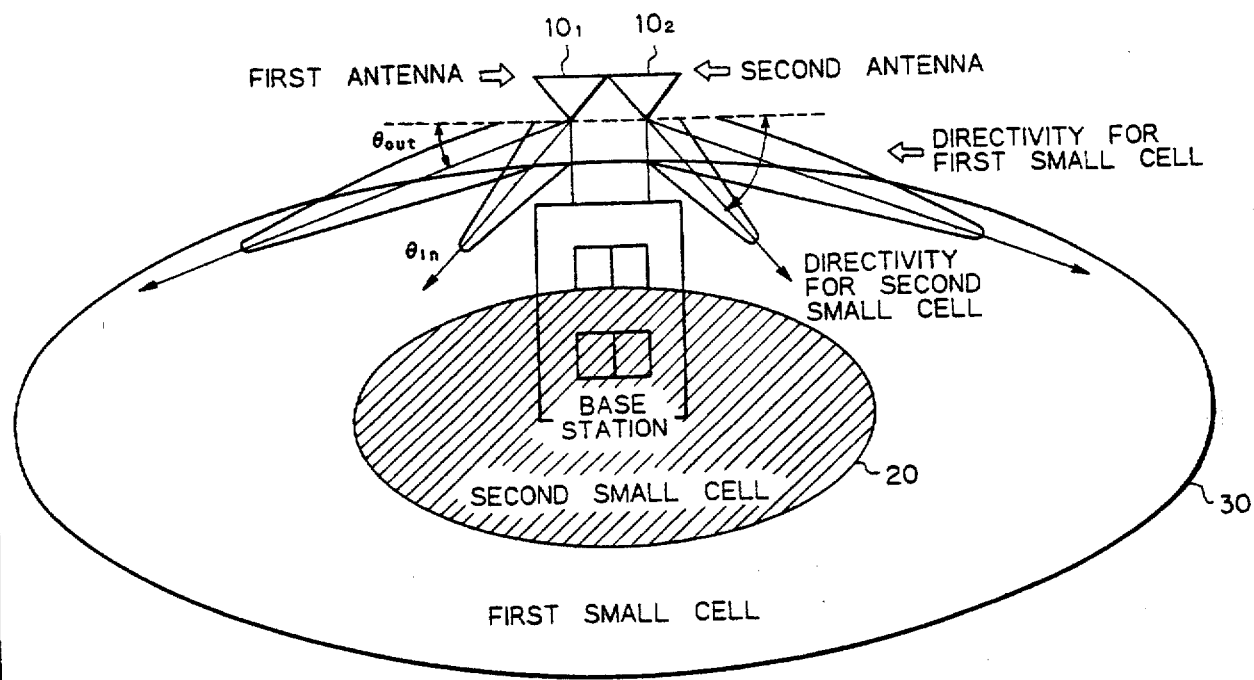

Fig. 5B

UNITED STATES PATENT AND TRADEMARK OFFICE
CERTIFICATE OF CORRECTION

PATENT NO. : 5,551,060
DATED : August 27, 1996
INVENTOR(S) : Fujii et al.

It is certified that error appears in the above-indentified patent and that said Letters Patent is hereby corrected as shown below:

Please delete Fig. 16B and substitute new Fig. 16B as follows:

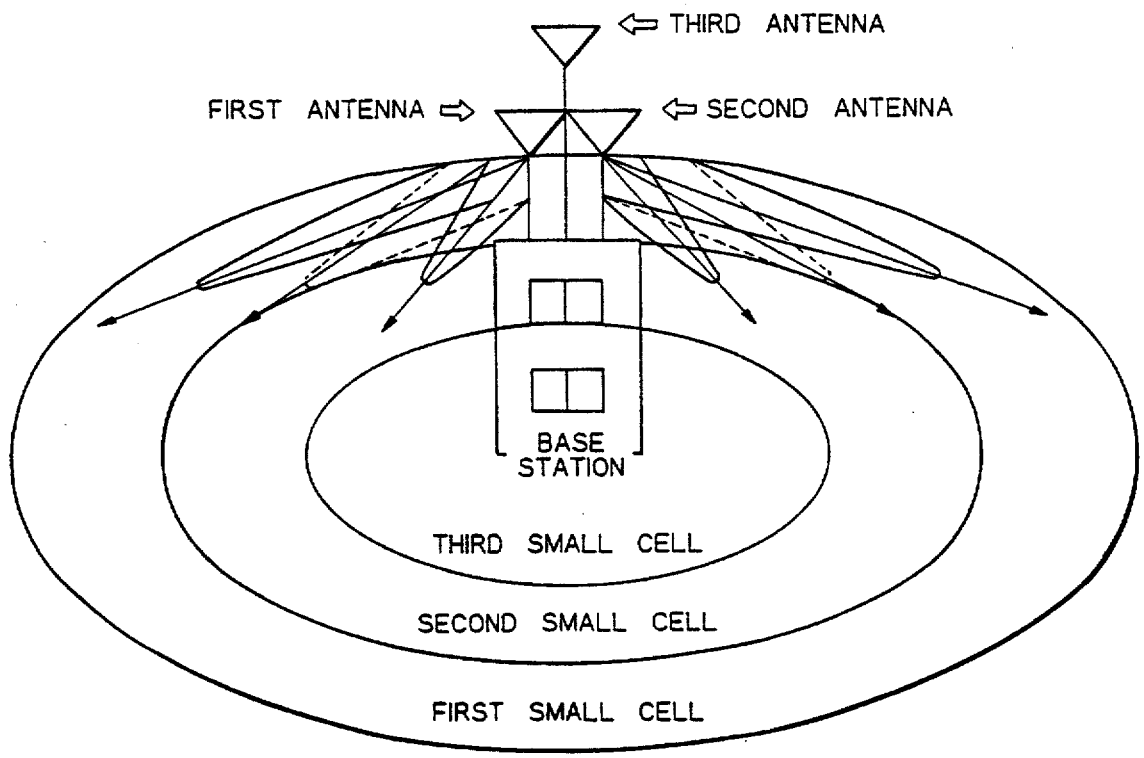

Fig. 16B

UNITED STATES PATENT AND TRADEMARK OFFICE
CERTIFICATE OF CORRECTION

PATENT NO. : 5,551,060

DATED : August 27, 1996

INVENTOR(S) : Fujii et al.

It is certified that error appears in the above-identified patent and that said Letters Patent is hereby corrected as shown below:

On title page,

Item [73], line 2, please insert second Assignee to read as -- NTT Mobile Communications Network, Inc., Tokyo, Japan. --

Signed and Sealed this

Twenty-fourth Day of March, 1998

*Attest:*

BRUCE LEHMAN

*Attesting Officer*     *Commissioner of Patents and Trademarks*